(12) United States Patent
Tabor et al.

(10) Patent No.: US 11,406,956 B2
(45) Date of Patent: *Aug. 9, 2022

(54) ARTICLES COMPRISING CORE SHELL LIQUID METAL ENCAPSULATE NETWORKS AND METHOD TO CONTROL ALTERNATING CURRENT SIGNALS AND POWER

(71) Applicant: Government of the United States, as represented by the Secretary of the Air Force, Wright-Patterson AFB, OH (US)

(72) Inventors: Christopher E. Tabor, Kettering, OH (US); Carl J. Thrasher, Beavercreek, OH (US); Alexander M. Watson, Dayton, OH (US); Nicholas J. Morris, Dayton, OH (US); Zachary J. Farrell, Xenia, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 396 days.

This patent is subject to a terminal disclaimer.

(21) Appl. No.: 16/580,652

(22) Filed: Sep. 24, 2019

(65) Prior Publication Data
US 2020/0139329 A1 May 7, 2020

Related U.S. Application Data

(60) Provisional application No. 62/754,635, filed on Nov. 2, 2018.

(51) Int. Cl.
*H01B 1/02* (2006.01)
*H01B 1/12* (2006.01)
(Continued)

(52) U.S. Cl.
CPC ............... *B01J 13/08* (2013.01); *H01B 1/02* (2013.01); *H01B 1/08* (2013.01); *H01B 1/12* (2013.01); *H01P 3/00* (2013.01); *H01Q 1/00* (2013.01)

(58) Field of Classification Search
CPC ....................................................... G06F 21/554
See application file for complete search history.

(56) References Cited

U.S. PATENT DOCUMENTS

| 5,198,189 A | 3/1993 | Booth et al. |
| 7,491,892 B2 | 2/2009 | Wagner et al. |

(Continued)

FOREIGN PATENT DOCUMENTS

| JP | H11220182 A | 8/1999 |
| KR | 101687371 B1 | 12/2016 |

(Continued)

OTHER PUBLICATIONS

Zhu, P.; Gao, S.; Lin, H.; Lu, X.; Yang, B.; Zhang, L.; Chen, Y.; Shi, J.; Inorganic Nanoshell-Stabilized Liquid Metal for Targeted Photonanomedicine in NIR-II Biowindow. Nano Lett. 2019, 19, 2128-2137.

(Continued)

*Primary Examiner* — Khanh T Nguyen
(74) *Attorney, Agent, or Firm* — AFMCLO/JAZ; James F. McBride

(57) ABSTRACT

The present invention relates to articles comprising core shell liquid metal encapsulate networks and methods of using core shell liquid metal encapsulate networks to control AC signals and power. Such method permits the skilled artisan to control the radiation, transmission, reflection and modulation of an AC signal and power. As a result, AC system properties such as operation frequency, polarization, (Continued)

gain, directionality, insertion loss, return loss, and impedance can be controlled under strain.

30 Claims, 4 Drawing Sheets

(51) Int. Cl.
  *B01J 13/08* (2006.01)
  *H01B 1/08* (2006.01)
  *H01Q 1/00* (2006.01)
  *H01P 3/00* (2006.01)

(56) References Cited

U.S. PATENT DOCUMENTS

| | | |
|---|---|---|
| 9,859,226 B1 | 1/2018 | Campbell et al. |
| 9,930,773 B2 | 3/2018 | Holbery et al. |
| 2003/0215394 A1 | 11/2003 | Short et al. |
| 2005/0284232 A1 | 12/2005 | Rice |
| 2008/0277631 A1 | 11/2008 | Smela et al. |
| 2013/0244037 A1 | 9/2013 | Hohman et al. |
| 2014/0147959 A1 | 5/2014 | Ratcurt et al. |
| 2016/0049227 A1 | 2/2016 | Bottiglio et al. |
| 2016/0218287 A1 | 7/2016 | McAlpine et al. |
| 2017/0089774 A1 | 3/2017 | Rykaczewski et al. |
| 2017/0218167 A1 | 8/2017 | Majidi et al. |
| 2017/0235021 A1 | 8/2017 | Boley et al. |
| 2018/0029290 A1 | 2/2018 | Bottiglio et al. |

FOREIGN PATENT DOCUMENTS

| | | |
|---|---|---|
| WO | WO2013044226 A2 | 3/2013 |
| WO | WO2015073944 A2 | 5/2015 |
| WO | WO2017072347 A1 | 5/2017 |
| WO | WO2017151523 A1 | 9/2017 |

OTHER PUBLICATIONS

Ren, L.; Sun, S.; Casillas-Garcia, G.; Nancarrow, M.; Peleckis, G.; Turdy, M.; Du, K.; Xu, X.; Li, W.; Jiang, L.; Dou, S. X.; Du, Y.; A Liquid-Metal-Based Magnetoactive Slurry for Stimuli-Responsive Mechanically Adaptive Electrodes. Advanced Materials. Adv. Mater. 2018, 30, 1802595.
Park, S.; Thangavel, G.; Parida, K.; Li, S.; Lee, P. S.; A Stretchable and Self-Healing Energy Storage Device Based on Mechanically and Electrically Restorative Liquid-Metal Particles and Carboxylated Polyurethane Composites. Adv. Mater. 2019, 31, 1805536.
Morris, N. J.; Farrell, Z. E.; Tabor, C. E.; Chemically modifying the mechanical properties of core-shell liquid metal nanoparticles. Nanoscale, 2019, 11, 17308-17318.
Liang, S.; Li, Y.; Chen, Y.; Yang, J.; Zhu, T.; Zhu, D.; He, C.; Liu, Y.; Handschuh-Wang, S.; Zhou, X.; Liquid metal sponges for mechanically durable, all-soft, electrical conductors. J. Mater. Chem. C, 2017, 5, 1586-1590.
Song, H.; Kim, T.; Kang, S.; Jin, H.; Lee, K.; Yoon, H. J.; Ga-Based Liquid Metal Micro/Nanoparticles: Recent Advances and Applications. Small 2019, 1903391.
Saborio, M. G.; Cai, S.; Tang, J.; Ghasemian, M. B.; Mayyas, M.; Han, J.; Michael J. Christoe, M. J.; Peng, S.; Koshy, P.; Esrafilzadeh, D.; Jalili, R.; Wang, C. H.; Kalantar-Zadeh, K.; Liquid Metal Droplet and Graphene Co-Fillers for Electrically Conductive Flexible Composites. Small 2019, 1903753.
Tutika, R.; Kmiec, S.; Haqu, A. B. M. T.; Martin, S. W.; Bartlett, M. D.; Liquid Metal-Elastomer Soft Composites with Independently Controllable and Highly Tunable Droplet Size and Volume Loading. ACS Appl. Mater. Interfaces 2019, 11, 17873-17883.
Li, X.; Li, M.; Xu, J.; You, J.; Yang, Z.; Li, C.; Evaporation-induced sintering of liquid metal droplets with biological nanofibrils for flexible conductivity and responsive actuation. Nature Communications, 2019, 10:3514.

Guo, R.; Wang, H.; Sun, X.; Yao, S.; Chang, H.; Wang, H.; Liu, J.; Zhang, Y.; Semiliquid Metal Enabled Highly Conductive Wearable Electronics for Smart Fabrics. ACS Appl. Mater. Interfaces 2019, 11, 30019-30027.
Park, J. E.; Kang, H. S.; Baek, J.; Park, T.H.; Oh, S.; Lee, H.; Koo, M.; Park, C.; Rewritable, Printable Conducting Liquid Metal Hydrogel. ACS Nano 2019, 13, 9122-9130.
Machine Translation of JPH11220182A, Yasunori et al. Publication Date Aug. 10, 1999.
Machine Translation of KR101687371 B1, Kyoo et al. Publication Date Dec. 16, 2016.
Bartlett, Michael D.; Fassler, Andrew; Kazem, Navid; Markvicka, Eric J.; Mandal, Pratiti; Majidi, Carmel; Stretchable, High-k Dielectric Elastomers through Liquid-Metal Inclusions. Adv. Mater. 2016, 28, 3726-3731.
Wagner, Sigurd; Bauer, Siegfried; Materials for stretchable electronics. MRS Bulletin, 2012, 37, 207-213.
Xu, Feng; Zhu, Yong; Highly conductive and stretchable silver nanowire conductors. Adv. Mater. 2012, 24, 5117-5122.
Liu, Z. F.; Fang, S.; Moura, F. A.; Ding, J. N.; Jiang, N.; Di, J.; Zhang, M.; Lepro, X.; Galvao, D. S.; Haines, C. S.; Yuan, N. Y.; Yin, S. G.; Lee, D. W.; Wang, R.; Wang, H. Y.; Lv, W.; Dong, C.; Zhang, R. C.; Chen, M. J.; Yin, Q.; Chong, Y. T.; Zhang, R.; Wang, X.; Lima, M. D.; Ovalle-Robles, R.; Qian, D.; Lu, H.; Baughman, R. H.; Hierarchically buckled sheath-core fibers for superelastic electronics, sensors, and muscles. Science 2015, 349, 6246, 400-404.
Wang, Jiangxin; Cai, Guofa; Li, Shaohui; Gao, Dace; Xiong, Jiaqing; Lee, Pooi See; Printable Superelastic Conductors with Extreme Stretchability and Robust Cycling Endurance Enabled by Liquid-Metal Particles. Adv. Mater. 2018, 30, 1706157, 1-7.
Hirsch, Arthur; Michaud, Hadrien O.; Gerratt, Aaron P.; De Mulatier, Severine; Lacour, Stephanie P.; Intrinsically Stretchable Biphasic (Solid-Liquid) Thin Metal Films. Adv. Mater. 2016, 28, 4507-4512.
Trevor R. Lear, Seok-Hee Hyun, John William Boley, Edward L. White, David H. Thompson, Rebecca K. Kramera, Liquid metal particle popping: Macroscale to nanoscale. Extreme Mechanics Letters 2017, 13, 126-134.
Boley, John W.; White, Edward L.; Kramer, Rebecca K.; Mechanically Sintered Gallium-Indium Nanoparticles. Adv. Mater. 2015, 27, 2355-2360.
Yamaguchi, Akihisa; Mashima, Yu; Iyoda, Tomokazu; Reversible Size Control of Liquid-Metal Nanoparticles under Ultrasonication. Angew. Chem. Int. Ed. 2015, 54, 12809-12813.
Cooper, Matthew A.; Ostanin, Victor P.; Klenerman, David; Slepstov, Alexander; Karaimanska, Rossitza; Dultsev, Fedor N.; Stirrups, Kathleen; Kelling, Sven; Iminson, Tony; Abell, Chris; A sensitive and economical method to directly detect particles. Sensors, 2002 IEEE; DOI: 10.1109/ICSENS.2002.1037256, 1042-1045.
Tang, Shi-Yang; Qiao, Ruirui; Yan, Sheng; Yuan, Dan; Zhao, Qianbin; Yun, Guolin; Davis, Thomas P.; Li, Weihua; Microfluidic Mass Production of Stabilized and Stealthy Liquid Metal Nanoparticles. Small 2018, 14, 1800118, 1-8.
Tevis, Ian D.; Newcomb, Lucas B.; Thuo, Martin; Synthesis of Liquid Core-Shell Particles and Solid Patchy Multicomponent Particles by Shearing Liquids Into Complex Particles (SLICE). Langmuir 2014, 30, 14308-14313.
Pan, Chengfeng; Kumar, Kitty; Li, Jianzhao; Markvicka, Eric J.; Herman, Peter R.; Majidi, Carmel; Visually Imperceptible Liquid-Metal Circuits for Transparent, Stretchable Electronics with Direct Laser Writing; Adv. Mater. 2018, 1706937, 1-9.
Çinar, Simge; Tevis, Ian D.; Chen, Jiahao; Thuo, Martin; Mechanical Fracturing of Core-Shell Undercooled Metal Particles for Heat-Free Soldering; Scientific Reports 2016,| 6:21864 | DOI: 10.1038/srep21864, 1-10.
Kubo, Masahiro; Li, Xiaofeng; Kim, Choongik; Hashimoto, Michinao; Wiley, Benjamin J.; Ham, Donhee; Whitesides; George M.; Stretchable Microfluidic Radiofrequency Antennas; Adv. Mater. 2010, 22, 2749-2752.
Hayes, Gerard J.; So, Ju-Hee; Qusba, Amit; Dickey, Michael D.; Lazzi, Gianluca; Flexible Liquid Metal Alloy (EGaIn) Microstrip Patch Antenna. IEEE Transactions on Antennas and Propagation. 2012, vol. 60, No. 5, 2151-2156.

(56) References Cited

OTHER PUBLICATIONS

So, Ju-Hee; Thelen, Jacob; Qusba, Amit; Hayes, Gerard J.; Lazzi, Gianluca; Dickey, Michael D.; Reversibly Deformable and Mechanically Tunable Fluidic Antennas. Adv. Funct. Mater. 2009, 19, 3632-3637.

Larmagnac, Alexandre; Eggenberger, Samuel; Janossy, Hanna; Voros, Janos; Stretchable electronics based on Ag-PDMS composites. Scientific Reports, 2014, 4:7254, 1-7.

Fassler, Andrew; Majidi, Carmel; Liquid-Phase Metal Inclusions for a Conductive Polymer Composite. Adv. Mater. 2015, 27, 1928-1932.

Khan, M. Rashed; Hayes, Gerard J.; Zhang, Silu; Dickey, Michael D.; Lazzi, Gianluca; A pressure responsive fluidic microstrip open stub resonator using a liquid metal alloy. IEEE Microwave Wireless Components Letters, 2012, vol. 22, No. 11, pp. 577-579.

Kubo, Masahiro; Li, Xiaofeng; Kim, Choongik; Hashimoto, Michinao; Wiley, Benjamin J.; Ham, Donhee; Whitesides, George M.; Stretchable microfluidic electric circuit applied for radio frequency antenna. Proc. IEEE APS-URSI, 2011, pp. 1582-1587.

Mazlouman, Shahrzad J.; Jiang, Xing J.; Mahanfar, Alireza N.; Menon, Carlo; Vaughan, Rodney G.; A reconfigurable patch antenna using liquid metal embedded in a silicone substrate. IEEE Trans. Antenna Propagat. Lett., 2011, vol. 59, pp. 4406-4412.

Diedhiou, Daouda L.; De Sagazan, Olivier; Sauleau, Ronan; Boriskin, Artem V.; Contactless microstrip transition for flexible microfluidic circuits and antennas. IEEE Antennas Wireless Propagat. Lett., 2015, vol. 14, pp. 1502-1505.

Agar, J.; Durden, J.; Staiculescu, D.; Zhang, R.; Gebara, E.; Wong, C.P.; Electrically conductive silicone nano-composites for stretchable RF devices. IEEE MTT-S IMS 2011.

Thrasher, C.; Zachary Farrell, Z.; Morris, N.; Willey, C.; Tabor, C.; Supporting Materials, Adv. Mater., 2019 DOI: 10.1002/adma.201903864, 1-7.

Thrasher, C.; Zachary Farrell, Z.; Morris, N.; Willey, C.; Tabor, C.; Mechanoresponsive Polymerized Liquid Metal Networks, Adv. Mater. 2019, 1903864, 1-8.

Tabor, C.; Polymerized Liquid Metal Networks for Stretchable Electronics ACS Colloids and Interfaces Conference, Jun. 18, 2019.

Tabor, C.; Adaptive 3D-Printed Liquid Metal Electronics TMS 2019, Mar. 13, 2019.

Tabor, C.; Responsive 3D-Printed Liquid Metal Electronics, MITRE Workshop May 6, 2019.

Tabor, C.; Gordon Research Conference Poster, Jan. 30, 2019.

Tabor, C.; Responsive Liquid Metals for Reconfigurable, Ultra-Stretchable, and Self-Healing Electronics, IEEE Flex Electronics Meeting, Aug. 13, 2019.

Tabor, C.; Polymerized Liquid Metal Networks for Stretchable Electronics, Flex Tech 2019, Feb. 21, 2019.

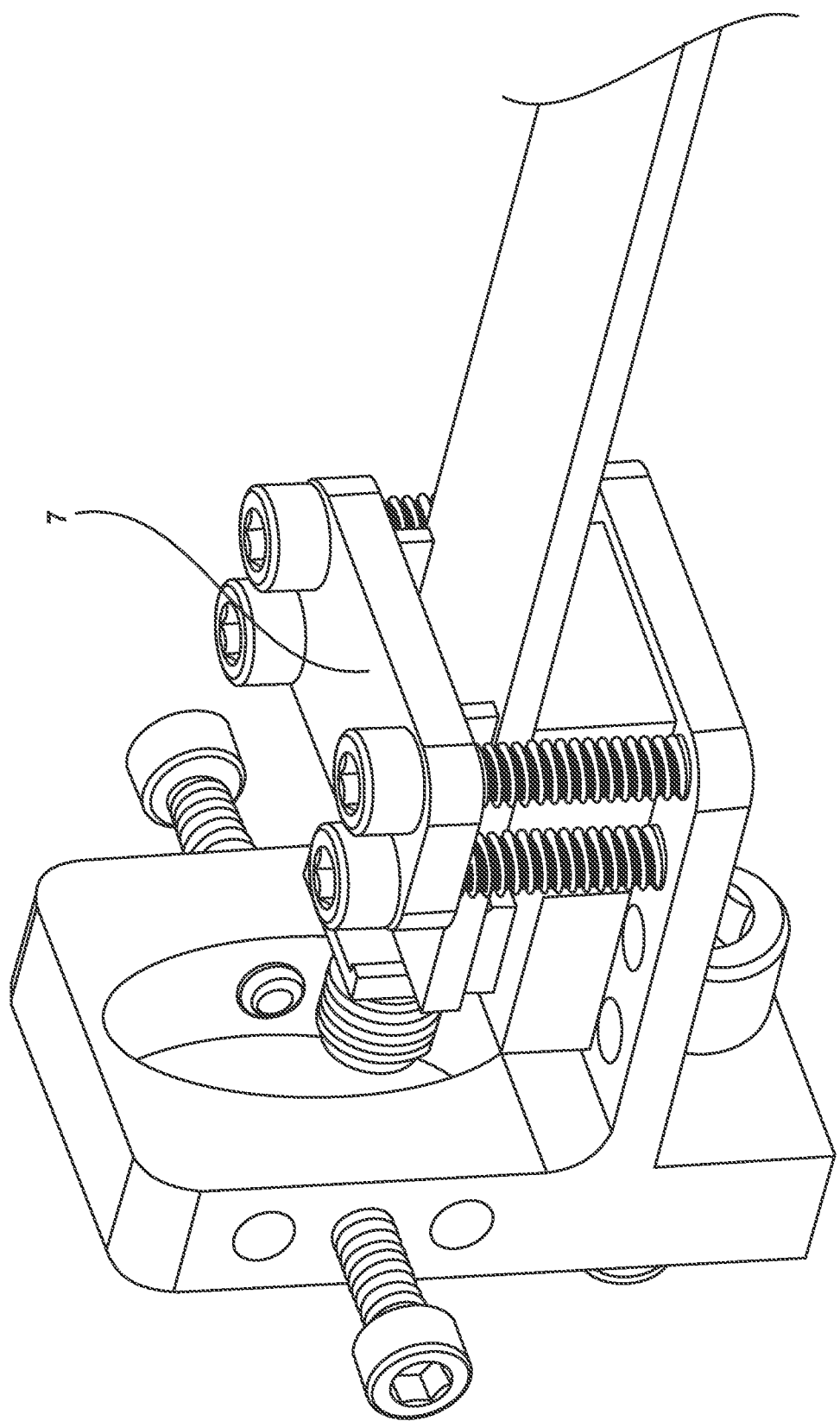

ARTICLES COMPRISING CORE SHELL LIQUID METAL ENCAPSULATE NETWORKS AND METHOD TO CONTROL ALTERNATING CURRENT SIGNALS AND POWER

CROSS-REFERENCE TO RELATED APPLICATION

The present application claims priority to U.S. Provisional Application Ser. No. 62/754,635 filed Nov. 2, 2018, the contents of which is hereby incorporated by reference in their entry.

RIGHTS OF THE GOVERNMENT

The invention described herein may be manufactured and used by or for the Government of the United States for all governmental purposes without the payment of any royalty.

FIELD OF THE INVENTION

The present invention relates to articles comprising core shell liquid metal encapsulate networks and methods of using core shell liquid metal encapsulate networks to control alternating current (AC) signals and power.

BACKGROUND OF THE INVENTION

The properties of AC systems such as antennas, transmission lines, frequency selective surfaces and wave guides are not easily controlled under strain because such properties are dependent on the geometry of such systems. Such properties are particularly subject to the geometry of the conductive components of AC systems. In order to control the properties of an AC system, such as the frequency of operation and power throughput, the geometry of the AC conductive material must be controlled. Unfortunately, the conductive material of typical AC systems, when subjected to strain, easily fail at relatively low strains. This leads to signal and power throughput reduction and may even lead to complete signal and power loss. To date, a conductive material that solves the aforementioned problem is still needed.

Applicants recognized that the AC conductivity of core shell liquid metal encapsulate networks does not fail at relatively low strains. Instead, the conductivity of such networks is constant or even can improve under strain. Thus, Applicants recognized that the use of such networks in AC systems would, to a significant degree, obviate the aforementioned problems. As a result, Applicants disclose methods of using core shell liquid metal encapsulate networks in AC systems to solve such current art problems.

SUMMARY OF THE INVENTION

The present invention relates to articles comprising core shell liquid metal encapsulate networks and methods of using core shell liquid metal encapsulate networks to control AC signals and power. Such method permits the skilled artisan to control the radiation, transmission, reflection, and modulation of an AC signal. As a result, AC system properties such as frequency, polarization, gain, directionality, impedance, insertion loss, return loss and mismatch loss can be controlled under strain.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIG. 4 is an isometric view of a top clamping counterface showing the strain isolation clamp 7 used to secure MUT and prevent strain on SMA connector and RF measurement cables during stretch testing.

DETAILED DESCRIPTION OF THE INVENTION

Definitions

Figure 1C:
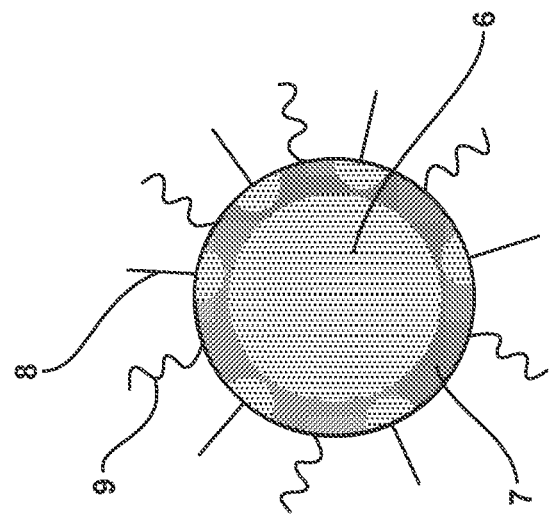
FIG. 1C is a cross-sectional view of a core shell liquid metal encapsulate comprising multi-functional ligands 9 that are covalently bound to gallium oxide comprising metal oxide shell 7 of such encapsulate and multi-functional ligands 8 that are coordinatively bound to the liquid metal core of such encapsulate via gallium eutectic gallium-indium alloy pocket in shell 7.
Figure 1B:
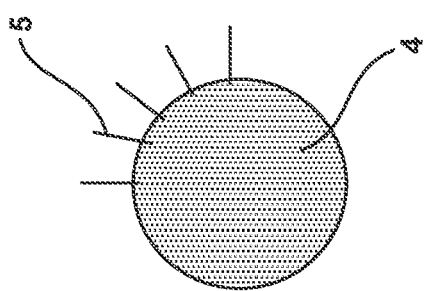
FIG. 1B is a cross-sectional view of a core shell liquid metal encapsulate, prior to shell formation, comprising multi-functional ligands 5 with head group that are coordinatively bound to the liquid metal core 4 that comprises eutectic gallium-indium alloy.
Figure 1A:
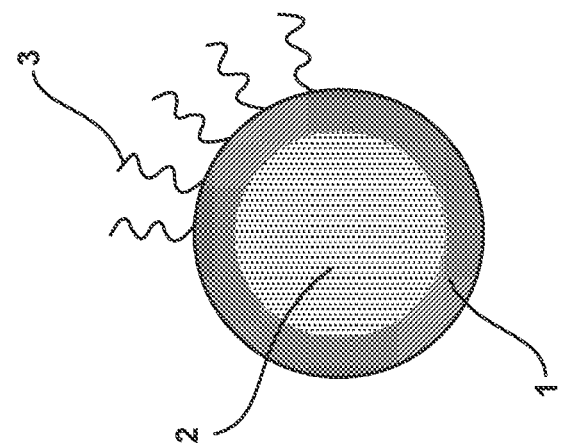
FIG. 1A is a cross-sectional view of a core shell liquid metal encapsulate comprising core 2 comprising eutectic gallium-indium alloy, multi-functional ligands 3 with head group that are covalently bound to gallium oxide comprising metal oxide shell 1.

Unless specifically stated otherwise, as used herein, the terms "a", "an" and "the" mean "at least one".

As used herein, the terms "include", "includes" and "including" are meant to be non-limiting.

As used in this specification the terms "encapsulate" and "particle" are synonymous.

As used in this specification, the term "EGaIn" is used to denote an alloy composed of 85.8% Ga, 14.2% In on an atomic basis.

All references in this specification to ImageJ software are to ImageJ software Version 1.51n.

Unless otherwise noted, all component or composition levels are in reference to the active portion of that component or composition, and are exclusive of impurities, for example, residual solvents or by-products, which may be present in commercially available sources of such components or compositions.

As used in this specification the terms "Radio Frequency (RF)" and "AC: Alternating Current" are synonymous, and refer to any electrical signal or electrical power that is greater than 0 Gigahertz (GHz) to about 20 GHz. Thus, this does not include direct current (DC).

As used in this specification the terms conductive, conductivity, resistance, resistivity, impedance refer to the complex electrical conductivity and electromagnetic properties at all AC frequencies greater than 0 GHz to about 20 GHz. Thus, this does not include direct current (DC).

As used in this specification the term "Control" refers to intentional design such that mechanical and physical perturbations in the AC system result in predictable electrical properties.

As used in this specification the term "activated" means having a resistivity below 100,000 ohms-meter.

As used in this specification the term "unactivated" means having a resistivity greater than or equal to 100,000 ohms-meter.

All percentages and ratios are calculated by weight unless otherwise indicated. All percentages and ratios are calculated based on the total composition weight unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Articles Comprising Core Shell Liquid Metal Encapsulate Networks

For purposes of this specification, headings are not considered paragraphs and thus this paragraph is Paragraph 0028 of the present specification. The individual number of each paragraph above and below this paragraph can be determined by reference to this paragraph's number. In this Paragraph 0028 an article is disclosed, said article comprises at least one conductive material and at least one dielectric material, said conductive material and/or said dielectric material comprising an activated core shell liquid metal encapsulate network when said core shell liquid metal encapsulate network material is the conductive material and an unactivated core shell liquid metal encapsulate network when said core shell liquid metal encapsulate network is the dielectric material, said at least one conductive material being capable of conducting alternating current greater than 0 GHz to about 20 GHz, said at least one dielectric material having a resistivity greater than or equal to 100,000 ohms-meter to said alternating current, said core shell liquid metal encapsulate network comprising a plurality of encapsulates, said encapsulates comprising a liquid metal core having an external surface, a metal oxide shell that encapsulates said liquid metal core, said shell having an external shell surface; and one or more multi-functional ligands covalently bound to said shell's external surface and/or coordinatively bound to said liquid metal core's external surface; said encapsulates' being chemically bound via a linkage comprising a residue of ligands of said encapsulates to the external shell of an encapsulate other than the external shell of the encapsulate to which said ligands were originally covalently or coordinatively bound thus forming said core shell liquid metal encapsulate network:

a) said encapsulates' liquid metal core comprises a liquid metal selected from the group consisting of Hg, Pb, Sn, Sb, Cd, Bi, Ga, In, Al, Zn, Ag, Au, Tl and mixtures thereof; preferably said liquid metal is selected from the group consisting of Ga, In, Sn, Bi, Pb, Cd, Sb and mixtures thereof; more preferably said liquid metal is selected from the group consisting of Ga, In, Sn, Bi, Sb and mixtures thereof; most preferably said liquid is metal selected from the group consisting of Ga, In and mixtures thereof;

b) said encapsulates' shell material comprises a metal oxide comprising a cation derived from a metal selected from the group consisting of Ga, In, Sn, Pb, Sb, Cd, Al, Zn, Tl, Bi, Ca, Sc, Ti, V, Cr, Sr, Y, Zr, Nb, Mo, Te, Gd, Hf, Pr, Nd, Pt, Sm, Eu, Dy, Ho, Er, Yb, Pu and mixtures thereof; preferably said metal oxide comprises a cation derived from a metal selected from the group consisting of Ga, Al, Zn, Sc, Ti, Cr, Zr, Nb, Gd, Nd, Sm and mixtures thereof; more preferably said metal oxide comprises a cation derived from a metal selected from the group consisting of Ga, Al, Zn, Gd, Nd and mixtures thereof; and c) said encapsulates' one or more multi-functional ligands comprising a head group that comprises a material selected from the group consisting of thiols, amines, phosphonic acids, alkoxysilanes, halosilanes, carboxylic acids, nitriles, and mixtures thereof; preferably said one or more multi-functional ligands comprise a head group that comprises a material selected from the group consisting of thiols, phosphonic acids, trialkoxysilanes, trichlorosilanes, and mixtures thereof; more preferably said one or more multi-functional ligands comprise a head group that comprises a material selected from the group consisting of thiols, trialkoxysilanes or phosphonic acids, and one or more additional moieties selected from the group consisting of a hydrosilane, a cyclic ester, an azide, an alcohol, an alkyne, an alkene, an isocyanate, a conjugated diene, an imine, a boronate ester, a conjugated ring, a carboxylic acid, an amine, a thiol, a phosphonic acid, an alkoxysilane, a halosilane, a nitrile and mixtures thereof; preferably said one or more additional moieties is selected from the group consisting of an unsubstituted anthracene, a substituted anthracene, an acrylate, a methacrylate, an epoxide, a ring-strained alkene, an unsubstituted alkene, a terminal alkyne, an acrylamide, a methacrylamide, a norbornene and mixtures thereof; most preferably said one or more multi-functional ligands are selected from the group consisting of 11-phosphonoundecyl acrylate, 3-(trimethoxysilyl)propyl acrylate, 3-(trimethoxysilyl) propyl methacrylate, (3-glycidyloxypropyl)triethoxysilane, 3-(triethoxysilyl)propyl isocyanate, 12-azidododecylphosphonic acid, trimethoxy[2-(7-oxabicyclo [4.1.0]hept-3-yl)ethyl]silane, 3-cyclopentadienylpropyltriethoxysilane, [(5-bicyclo [2.2.1]hept-2-enyl)ethyl]triethoxysilane, 11-phosphonoundecanoic acid, and mixtures thereof. In addition to the aforementioned encapsulates, encapsulates that comprise a multi-functional ligand that comprise a thiocarbonate may be used to form a core shell liquid metal encapsulate network.

An article according to Paragraph 0028 is disclosed wherein;
a) said encapsulates' liquid metal core comprises a liquid metal alloy selected from the group consisting of Ga/In, Ga/In/Sn, Ga/In/Sn/Sb, In/Sn/Bi, Bi/Pb/Sn, Bi/Pb/Sn/Cd, Bi/Pb/Sn/Cd/In and mixtures thereof, preferably said liquid metal is selected from the group consisting of Ga/In, Ga/In/Sn, Ga/In/Sn/Sb, In/Sn/Bi and mixtures thereof; most preferably said liquid is metal selected from the group consisting of 85.8 atom % Ga/14.2 atom % In, 78.3 atom % Ga/14.9 atom % In/6.8 atom % Sn and mixtures thereof,
b) said encapsulates' shell comprises a metal oxide comprising a cation derived from a metal selected from the group consisting of Ga, Sn, Sb, Cd, Bi, In and mixtures thereof; preferably said metal oxide is selected from the group consisting of Ga, In, Bi and mixtures thereof, and
c) said encapsulates' one or more multi-functional ligands comprise a head group that comprises a material selected from the group consisting of phosphonic acids, trialkoxysilanes, or mixtures thereof; preferably said one or more ligands comprises a head group that comprises a material are selected from the group consisting of phosphonic acids or trialkoxysilanes possessing an acrylate or methacrylate moiety and mixtures thereof, more preferably said one or more multi-functional ligands are selected from the group consisting of 11-phosphonoundecyl acrylate, 3-(trimethoxysilyl)propyl methacrylate and mixtures thereof.

An article according to Paragraphs 0028 through 0029 is disclosed, wherein said encapsulate has a shell thickness of from about 0.5 nanometers to about 5 nanometers. This shell thickness is desirable when said encapsulates are used in a stretchable resistor such as a core shell liquid metal encapsulate network or when said encapsulates are used in applications that need to rupture the encapsulates via compression and/or shear forces such as a self-healing conductor or coating.

An article according to any of Paragraphs 0028 through 0030 is disclosed, wherein said core shell liquid metal encapsulate network's linkage has the formula:

*-X-R-X-* wherein for said formula:
a) each * represents the chemical attachment point to a core shell liquid metal encapsulate;
b) each X represents a molecular segment selected from the group of chemical structures comprising C—S, C—N, C—P—O, C—Si—O, O—Si—O, C—O; preferably said molecular segment is selected from the group of chemical structures comprising thiols, amines, phosphonates, silyl ethers, esters and mixtures thereof; more preferably said molecular segment is selected from the group of chemical structures comprising phosphonates and silyl ethers and mixtures thereof;
c) R represents a molecular segment independently selected from the group of chemical structures comprising C—C, C═C, C—S—C, N—N—N, C—N, O—C—N, C—O—C, Si—O—Si; preferably said molecular segment is selected from the group of chemical structures comprising thioethers, triazoles, dimerized ring systems, urethanes, ethers, esters, amides, tetrahydropyridines, alkanes, aromatics, siloxanes and mixtures thereof; more preferably said molecular segment is selected from the group of chemical structures comprising thioethers, triazoles, urethanes, ethers, amides, carboxylic acid esters, siloxanes and mixtures thereof; most preferably said molecular segment is selected from the group of chemical structures comprising polyethers, polyacrylates, polyacrylamides, polyurethanes, polysiloxanes, thioethers, triazoles, and mixtures thereof.

An article according to any of Paragraphs 0028 through 0031 is disclosed, wherein said core shell liquid metal encapsulate network comprises, based on total core shell liquid metal encapsulate network mass, from about 88.9% to about 99.99% metal; preferably from about 95% to about 99.99% metal; more preferably from about 99% to about 99.99% metal is disclosed.

An article according to any of Paragraphs 0028 through 0032 is disclosed, wherein said core shell liquid metal encapsulate network is a stretchable conductor that comprises a liquid metal selected from the group consisting of Hg, Pb, Sn, Sb, Cd, Bi, Ga, In, Al, Zn, Ag, Au, Tl and mixtures thereof; preferably said liquid metal is selected from the group consisting of Ga, In, Sn, Bi, Pb, Cd, Sb and mixtures thereof, more preferably said liquid metal is selected from the group consisting of Ga, In, Sn, Bi, Sb and mixtures thereof; most preferably said liquid metal is selected from the group consisting of Ga, In and mixtures thereof.

An article according to any of Paragraphs 0028 through 0033 is disclosed wherein said at least one conductor independently comprises a material selected from the group consisting of Cu, Au, Ag, Al, W, Ga, In, Sn, Hg, Bi, Ni, Ta, graphene, graphite, carbon nanotubes, conjugated polymers such as poly(3,4-ethylenedioxythiophene) (PEDOT) and doped PEDOT, transparent conductive oxides such as indium tin oxide, fluorine doped tin oxide, doped zinc oxide and mixtures thereof.

An article according to any of Paragraphs 0028 through 0034 is disclosed wherein each dielectric independently comprises a material selected from the group consisting of un-cross-linked liquid metal encapsulates, an organosilicon compound such as polydimethylsiloxane, a polyimide, a polyurethane such as thermoplastic urethanes, air, glass epoxy composites, fluorinated polymers such as PTFE, polyether ether ketone, liquid crystal polymers, hydrocarbon ceramic laminates, ceramics, and mixtures thereof.

An article according to any of Paragraphs 0028 through 0034 is disclosed said article being selected from the group consisting of antennas; and transmission lines, preferably said transmission lines are selected from the group consisting of coplanar wave guides, coaxial wave guides, embedded microstrip lines, microstrip lines, striplines; frequency selective surfaces, preferably said frequency selective surfaces are selected from the group consisting of electromagnetic filters, RF shields, RF reflectors, and polarizers; inductors; electronic switches; electronic filter; conductive vias; or capacitors.

Examples of Articles Comprising Core Shell Liquid Metal Encapsulate Networks Include

| Article | Preferred Number of Elastic Dielectrics | Preferred Number of Activated Core Shell Liquid Metal Encapsulate Network Conductors |
|---|---|---|
| Coplanar Waveguide Transmission Line | 2 | 3 |
| Microstrip Transmission Line | 2 | 2 |

| Article | Preferred Number of Elastic Dielectrics | Preferred Number of Activated Core Shell Liquid Metal Encapsulate Network Conductors |
|---|---|---|
| Embedded Microstrip Transmission Line | 1 | 2 |
| Stripline Transmission Line | 1 | 3 |
| Coaxial Transmission Line | 1 | 2 |
| Inductor | 1 | 1 |
| Capacitor | 1 | 2 |
| Resistor | 1 | 1 |
| RF Shield | 1 | 1 |
| Circuit Filter | 1 | 2 |
| RF Reflector | 1 | 1 |
| Frequency Selective Surface* | 1 | 1 |
| Strain Activated Switch | 2** | 0 |

*May be repeated one or more times
**One of the dielectrics is an unactivated core shell liquid metal encapsulate network that is disposed on and/or encased in the second dielectric. Such unactivated core shell liquid metal encapsulate network becomes activated under strain.

Method to Control Alternating Current Signals and Power

A method is disclosed, said method being a method of using a core shell liquid metal encapsulate network to control the properties of an article according to any preceding claim comprising using an unactivated core shell liquid metal encapsulate network as a dielectric to insulate one or more of said article's conductors; activating said core shell liquid metal encapsulate network; and/or changing the geometry of said liquid metal encapsulate network after said core shell liquid metal encapsulate network is activated, preferably activating said core shell liquid metal encapsulate network comprises mechanical elongation, compression, shearing, and/or directly impacting said core shell liquid metal encapsulate network.

A method according to Paragraph 0038 is disclosed, said method comprising using one or more of said activated core shell liquid metal encapsulate networks as article conductors.

Encapsulates Comprising a Liquid Metal Core

Applicants disclose an encapsulate comprising a liquid metal core having an external surface, a metal oxide shell that encapsulates said liquid metal core, said shell having an external shell surface; and one or more multi-functional ligands covalently bound to said shell's external surface and/or coordinatively bound to said liquid metal core's external surface:
a) said liquid metal core comprising a liquid metal selected from the group consisting of Hg, Pb, Sn, Sb, Cd, Bi, Ga, In, Al, Zn, Ag, Au, Tl and mixtures thereof; preferably said liquid metal is selected from the group consisting of Ga, In, Sn, Bi, Pb, Cd, Sb and mixtures thereof; more preferably said liquid metal is selected from the group consisting of Ga, In, Sn, Bi, Sb and mixtures thereof; most preferably said liquid is metal selected from the group consisting of Ga, In and mixtures thereof;
b) said shell comprising a metal oxide comprising a cation derived from a metal selected from the group consisting of Ga, In, Sn, Pb, Sb, Cd, Al, Zn, Tl, Bi, Ca, Sc, Ti, V, Cr, Sr, Y, Zr, Nb, Mo, Te, Gd, Hf, Pr, Nd, Pt, Sm, Eu, Dy, Ho, Er, Yb, Pu and mixtures thereof; preferably said metal oxide comprises a cation derived from a metal selected from the group consisting of Ga, Al, Zn, Sc, Ti, Cr, Zr, Nb, Gd, Nd, Sm and mixtures thereof; more preferably said metal oxide comprises a cation derived from a metal selected from the group consisting of Ga, Al, Zn, Gd, Nd and mixtures thereof; and
c) said one or more multi-functional ligands comprising a head group that comprises a material selected from the group consisting of thiols, amines, phosphonic acids, alkoxysilanes, halosilanes, carboxylic acids, nitriles, and mixtures thereof; preferably said one or more multi-functional ligands comprise a head group that comprises a material selected from the group consisting of thiols, phosphonic acids, trialkoxysilanes, trichlorosilanes, and mixtures thereof; more preferably said one or more multi-functional ligands comprise a head group that comprises a material selected from the group consisting of thiols, trialkoxysilanes or phosphonic acids, and one or more additional moieties selected from the group consisting of a hydrosilane, a cyclic ester, an azide, an alcohol, an alkyne, an alkene, an isocyanate, a conjugated diene, an imine, a boronate ester, a conjugated ring, a carboxylic acid, an amine, a thiol, a phosphonic acid, an alkoxysilane, a halosilane, a nitrile and mixtures thereof; preferably said one or more additional moieties is selected from the group consisting of an unsubstituted anthracene, a substituted anthracene, an acrylate, a methacrylate, an epoxide, a ring-strained alkene, an unsubstituted alkene, a terminal alkyne, an acrylamide, a methacrylamide, a norbornene and mixtures thereof; most preferably said one or more multi-functional ligands are selected from the group consisting of 11-phosphonoundecyl acrylate, 3-(trimethoxysilyl)propyl acrylate, 3-(trimethoxysilyl) propyl methacrylate, (3-glycidyloxypropyl) triethoxysilane, 3-(triethoxysilyl)propyl isocyanate, 12-azidododecylphosphonic acid, trimethoxy[2-(7-oxabicyclo[4.1.0]hept-3-yl)ethyl]silane, 3-cyclopentadienylpropyltriethoxysilane, [(5-bicyclo[2.2.1]hept-2-enyl)ethyl]triethoxysilane, 11-phosphonoundecanoic acid, and mixtures thereof.

Applicants disclose an encapsulate according to Paragraph 0040 wherein:
a) said liquid metal core comprising a liquid metal alloy selected from the group consisting of Ga/In, Ga/In/Sn, Ga/In/Sn/Sb, In/Sn/Bi, Bi/Pb/Sn, Bi/Pb/Sn/Cd, Bi/Pb/Sn/Cd/In and mixtures thereof; preferably said liquid metal is selected from the group consisting of Ga/In, Ga/In/Sn, Ga/In/Sn/Sb, In/Sn/Bi and mixtures thereof; most preferably said liquid is metal selected from the group consisting of 85.8 atom % Ga/14.2 atom % In, 78.3 atom % Ga/14.9 atom % In/6.8 atom % Sn and mixtures thereof;
b) said shell comprising a metal oxide comprising a cation derived from a metal selected from the group consisting of Ga, Sn, Sb, Cd, Bi, In and mixtures thereof; preferably said metal oxide is selected from the group consisting of Ga, In, Bi and mixtures thereof; and
c) said one or more multi-functional ligands comprise a head group that comprises a material selected from the group consisting of phosphonic acids, trialkoxysilanes, or mixtures thereof; preferably said one or more ligands comprises a head group that comprises a material are selected from the group consisting of phosphonic acids or trialkoxysilanes possessing an acrylate or methacrylate moiety and mixtures thereof; more preferably said one or more multi-functional ligands are selected from the group consisting of 11-phosphonoundecyl acrylate, 3-(trimethoxysilyl)propyl methacrylate and mixtures thereof.

Applicants disclose an encapsulate according to any of Paragraphs 0040 and 0041 wherein said encapsulate has a shell thickness of from about 0.5 nanometers to about 5 nanometers. This shell thickness is desirable when said encapsulates are used in a stretchable resistor such as a core shell liquid metal encapsulate network or when said encapsulates are used in applications that need to rupture the encapsulates via compression and/or shear forces such as a self-healing conductor or coating.

Applicants disclose an encapsulate according to any of Paragraphs 0040 through 0042 wherein said encapsulate has a principal dimension of from about 5 nanometers to about 5 millimeters. Preferably said encapsulate has a principal dimension of from about 500 nanometers to about 10 microns when said encapsulates are used in a stretchable resistor such as a core shell liquid metal encapsulate network or a principal dimension of from about 50 nanometers to about 200 nanometers when said encapsulates are used in applications that need to rupture the encapsulates via compression and/or shear forces such as a self-healing conductor or coating.

Core Shell Liquid Metal Encapsulate Network

Applicants disclose a core shell liquid metal encapsulate network comprising a plurality of encapsulates selected from the group consisting of encapsulates according to Paragraphs 0040 through 0043, and mixtures there of wherein said encapsulates' are chemically bound via a linkage comprising a residue of said ligands of said encapsulates to the external shell of an encapsulate other than the external shell of the encapsulate to which said ligands were originally covalently or coordinatively bound. In addition to the encapsulates according to Paragraphs 0040 through 0043, an encapsulate according to Paragraphs 0040 through 0043 that comprises a multi-functional ligand that comprises a thiocarbonate may be used to form a core shell liquid metal encapsulate network.

Applicants disclose a core shell liquid metal encapsulate network according to Paragraph 0044 wherein said linkage has the formula:

*-X-R-X-* a) each * represents the chemical attachment point to a core shell liquid metal encapsulate;
b) each X represents a molecular segment selected from the group of chemical structures comprising C—S, C—N, C—P—O, C—Si—O, O—Si—O, C—O; preferably said molecular segment is selected from the group of chemical structures comprising thiols, amines, phosphonates, silyl ethers, esters and mixtures thereof; more preferably said molecular segment is selected from the group of chemical structures comprising phosphonates and silyl ethers and mixtures thereof;
c) R represents a molecular segment independently selected from the group of chemical structures comprising C—C, C=C, C—S—C, N—N—N, C—N, O—C—N, C—O—C, Si—O—Si; preferably said molecular segment is selected from the group of chemical structures comprising thioethers, triazoles, dimerized ring systems, urethanes, ethers, esters, amides, tetrahydropyridines, alkanes, aromatics, siloxanes and mixtures thereof; more preferably said molecular segment is selected from the group of chemical structures comprising thioethers, triazoles, urethanes, ethers, amides, carboxylic acid esters, siloxanes and mixtures thereof; most preferably said molecular segment is selected from the group of chemical structures comprising polyethers, polyacrylates, polyacrylamides, polyurethanes, polysiloxanes, thioethers, triazoles, and mixtures thereof.

Applicants disclose a core shell liquid metal encapsulate network according to any of Paragraphs 0044 and 0045, said core shell liquid metal encapsulate network comprising, based on total core shell liquid metal encapsulate network mass, from about 88.9% to about 99.99% metal; preferably from about 95% to about 99.99% metal; more preferably from about 99% to about 99.99% metal.

Applicants disclose a core shell liquid metal encapsulate network according to any of Paragraphs 0044 through 0046 wherein said energy induced conductivity gain arises as a result of a geometric deformation of said network's core shell liquid metal encapsulate or core shell liquid metal encapsulate network, preferably said geometric deformation is induced by compression, tension, and/or shear of said network's core shell liquid metal encapsulate or core shell liquid metal encapsulate network. More preferably, said geometric deformation is induced by compression, tension, and/or shear of said network's core shell liquid metal encapsulate or core shell liquid metal encapsulate network as a result of a manual or autonomic process performed under a monotonic or cyclic loading scenario. Most preferably, said geometric deformation is a result of tension and/or shear arising as a result of manually elongating said network's core shell liquid metal encapsulate or core shell liquid metal encapsulate network to a strain between 50% and 300%. Additional preferred embodiments include: where said geometric deformation is a result of tension and/or shear arising from incrementally elongating said network's core shell liquid metal encapsulate or core shell liquid metal encapsulate network to a strain between 50% and 300%, returning to an unstrained state, before manually or autonomically elongating to a higher level of strain than that previously experienced by the system; where said geometric deformation is a result of compression and/or shear arising from compressing said network's core shell liquid metal encapsulate or core shell liquid metal encapsulate network between rigid, conductive counter-faces; where said geometric deformation is a result of elongation of a substrate material in physical and/or chemical contact with said core shell liquid metal encapsulate network or where said geometric deformation is a result of compression and/or shear force applied with a rigid and low-surface energy material.

Stretchable Conductor

Applicants disclose a stretchable AC conductor that conducts AC current comprising a liquid metal selected from the group consisting of Hg, Pb, Sn, Sb, Cd, Bi, Ga, In, Al, Zn, Ag, Au, Tl and mixtures thereof; preferably said liquid metal is selected from the group consisting of Ga, In, Sn, Bi, Pb, Cd, Sb and mixtures thereof; more preferably said liquid metal is selected from the group consisting of Ga, In, Sn, Bi, Sb and mixtures thereof; most preferably said liquid metal is selected from the group consisting of Ga, In and mixtures thereof; said stretchable conductor having one or more of the following properties.

Applicants disclose a stretchable AC conductor according to Paragraph 0048, wherein said stretchable conductor comprises a core shell liquid metal encapsulate network. In one aspect, said core shell liquid metal encapsulate network is a core shell liquid metal encapsulate network according to any of Paragraphs 0040 through 0043.

Process of Making Encapsulates Comprising a Liquid Metal Core and Core Shell Liquid Metal Encapsulate Networks Applicants disclose a process of producing an encapsulate comprising a liquid metal core and a metal oxide shell that encapsulates said liquid metal core, said process comprising:
a) contacting a liquid metal selected from the group consisting of Hg, Pb, Sn, Sb, Cd, Bi, Ga, In, Al, Zn, Ag, Au, Tl and mixtures thereof; preferably said liquid metal is selected from the group consisting of Ga, In, Sn, Bi, Pb, Cd, Sb and mixtures thereof; more preferably said liquid metal is selected from the group consisting of Ga, In, Sn, Bi, Sb and mixtures thereof; most preferably said liquid is metal selected from the group consisting of Ga, In and mixtures thereof; with one or more multi-functional ligands comprising a material selected from the group consisting of thiols, amines, and mixtures thereof; preferably said one or more multi-functional ligands comprise a material selected from the group consisting of thiols; more preferably said one or more multi-functional ligands comprise a material selected from the group consisting of thiols and one or more moieties selected from the group consisting of a hydrosilane, a cyclic ester, an azide, an alcohol, an alkyne, an alkene, an isocyanate, a conjugated diene, an imine, a boronate ester, a conjugated ring and mixtures thereof; preferably said one or more moieties is selected from the group consisting of an unsubstituted anthracene, a substituted anthracene, an acrylate, a methacrylate, an epoxide, a ring-strained alkene, an unsubstituted alkene, a terminal alkyne, an acrylamide, a methacrylamide, a norbornene and mixtures thereof; and/or
b) contacting at least a portion of said metal oxide shell with one or more multi-functional ligands comprising a material selected from the group consisting of phosphonic acids, alkoxysilanes, halosilanes, carboxylic acids and mixtures thereof; preferably said one or more multi-functional ligands comprise a material selected from the group consisting of phosphonic acids, trialkoxysilanes, trichlorosilanes, and mixtures thereof; more preferably said one or more multi-functional ligands comprise a material selected from the group consisting of trialkoxysilanes or phosphonic acids, and one or more moieties selected from the group consisting of a hydrosilane, a cyclic ester, an azide, an alcohol, an alkyne, an alkene, an isocyanate, a conjugated diene, an imine, a boronate ester, a conjugated ring and mixtures thereof; preferably said one or more moieties is selected from the group consisting of an unsubstituted anthracene, a substituted anthracene, an acrylate, a methacrylate, an epoxide, a ring-strained alkene, an unsubstituted alkene, a terminal alkyne, an acrylamide, a methacrylamide, a norbornene and mixtures thereof; most preferably said one or more ligands are selected from the group consisting of 11-phosphonoundecyl acrylate, 3-(trimethoxysilyl)propyl acrylate, 3-(trimethoxysilyl)propyl methacrylate, (3-glycidyloxypropyl) triethoxysilane, 3-(triethoxysilyl)propyl isocyanate, 12-azidododecylphosphonic acid, trimethoxy[2-(7-oxabicyclo[4.1.0]hept-3-yl)ethyl]silane, 3-cyclopentadienylpropyltriethoxysilane, [(5-bicyclo[2.2.1]hept-2-enyl)ethyl]triethoxysilane and mixtures thereof;
c) optionally agitate and/or heat the combination formed in a) and/or b), preferably said agitation is sufficient to prevent sedimentation of said encapsulates and the temperature of said combination formed in a) and/or b) is maintained at a temperature of from about 45° C. to about 60° C. for a time of about two to about four hours;
d) optionally, removing unbound ligands by dialysis with a solvent and/or by several iterations of centrifugation and washing;
e) optionally, suspending the core shell liquid metal encapsulates in fresh solvent.

Applicants disclose a process according to Paragraph 0050 wherein one, two or three of the following steps are preformed:
a) the combination formed in a) and/or b) of Paragraph 0050 is agitated and/or heated, preferably said agitation is sufficient to prevent sedimentation of said encapsulates and the temperature of said combination formed in a) and/or b) of Paragraph 0050 is maintained at a temperature of from about 45° C. to about 60° C. for a time of about two to about four hours;
b) unbound ligands are removed by dialysis with a solvent and/or by several iterations of centrifugation and washing;
c) the core shell liquid metal encapsulates are suspended in fresh solvent.

Applicants disclose a process of producing a core shell liquid metal encapsulate network from a plurality of core shell liquid metal encapsulates comprising multi-functional ligands, said process comprising stimulating said multi-functional ligands by imparting energy to said ligands and/or combining said multi-functional ligands with one or more initiators; preferably said energy is imparted by electromagnetic radiation, heat, or mechanical stimulus and preferably said one or more initiators is selected from the group consisting of photoradical initiators, thermoradical initiators, mechanoradical generators, photoacid generators, thermal acid generators, mechano-acid generators, poly-azido molecules, poly-alkyne molecules, poly-thiol molecules, poly-alkene molecules, polyols, poly-isocyanates, copper compounds, ruthenium compounds, silver compounds, and reducing organic acids and more preferably, said energy is imparted by electromagnetic radiation or heat and preferably said one or more initiators is selected from the group consisting of photoradical initiators, photoacid generators, thermal acid generators, poly-alkyne molecules, poly-alkene molecules, polyols, copper compounds, ruthenium compounds, and reducing organic acids; most preferably, said energy is imparted by electromagnetic radiation and preferably said one or more initiators is selected from the group consisting of photoradical initiators, photoacid generators, poly-alkyne molecules, polyols, copper compounds, and ascorbic acid.

Applicants disclose a process according to Paragraph 0052 wherein said core shell liquid metal encapsulates comprising multi-functional ligands are suspended in a continuous liquid phase prior to being stimulated and optionally deposited on a substrate and optionally dried on said substrate.

Methods of Using Core Shell Liquid Metal Encapsulate Network

Applicants disclose a method of using a liquid metal encapsulate network, said method comprising: applying said liquid metal encapsulate network to a substrate including coating at least a portion of one or more surfaces of said substrate with said liquid metal encapsulate network, encapsulating said substrate with said liquid metal encapsulate network; connecting at least a portion of two or more substrates with said liquid metal encapsulate network and/or using said liquid metal encapsulate network as an internal component of a substrate, for example, using said liquid metal encapsulate network as the core of an encapsulate. In any of the aforementioned uses, the linkages in said network can be formed before, during, or after the application of said liquid metal encapsulate network. The application of said liquid metal encapsulate network to a substrate can be achieved by methods including but not limited to: ink jet printing, aerosol jet printing, screen printing, gravure, blade coating, solution casting, spin coating, direct ink writing, extruding and combinations thereof. After being applied, said liquid metal encapsulate network may be photopatterned to selectively activate the liquid metal encapsulate network and/or change at least one portion of said liquid metal encapsulate network.

Test Methods

Determination of Encapsulate Principal Dimension

Preparation of Sizing Encapsulates in the Size Range of 10 nanometers to 500 nanometers.
Encapsulates are sized using high-resolution scanning transmission electron microscope (STEM) images taken with a high-angle annular dark-field detector on a transmission electron microscope operating at an accelerating voltage of 200,000 electron volts. Encapsulate particles are mounted for STEM measurements by first adding 50 microliters of a given encapsulate suspension having an encapsulate concentration range between $1*10^{-5}$ and $1*10^{-4}$ millimolar to 2 milliliters of dichloromethane followed by dropping this diluted suspension onto a 400-mesh copper, carbon-film coated transmission electron microscopy grid held in self-closing, anti-capillary tweezers until a single drop falls from the grid. Following deposition, a folded piece of filter paper is used to wick excess solvent from the grid underside.

Preparation of Sizing Encapsulates in the Size Range of 501 nanometers to 5,000,000 nanometers (5 millimeters). The encapsulates are prepared for measurement by first drop casting films on copper tape and coating the encapsulates in 10 nanometers of iridium. Encapsulates are characterized using scanning electron microscopy (SEM) at an accelerating voltage of 1000 volts and with an aperture of 20 micrometers.

ImageJ software (freely available from the National Institute of Health) is used to open images corresponding to each sample and to manually draw lines bisecting encapsulates along their longest dimension, followed by recording the length of each line drawn. This process is repeated for at least 300 encapsulates in each sample. Following measurement, the average diameter and surface-area weighted average diameter are calculated from the tabulated data.

Shell Thickness—Scanning Transmission Electron Microscopy (STEM)

STEM images of encapsulate particles are processed using the "Find Edges" routine built into the software package ImageJ which uses a Sobel image filter to highlight spatial changes in image contrast. As STEM images provide contrast based on the atomic number of the elements imaged, oxide shells typically have a difference in signal from the encapsulate core and any adventitious carbon overlayer. The "Find Edges" function reveals two lines surrounding the encapsulate; one line corresponds to the shell inner edge and one line corresponds to the shell outer edge. An intensity profile is generated within ImageJ by drawing a line which perpendicularly bisects the shell inner and outer edges followed by selection of the "Plot Profile" function. A line is then drawn on the resultant profile between the intensity maxima and a measurement taken of this distance. 50 of these measurements are taken and averaged to calculate the average encapsulate shell thickness.

Shell Thickness—X-Ray Photoelectron Spectroscopy (XPS)

XPS measurements of encapsulate oxide shell thicknesses are produced as follows. Two films for XPS are produced by spin-coating a first encapsulate sample dispersed in absolute ethanol at 2000 RPM onto substrates consisting of single-sided copper adhesive tape affixed to a 1 centimeter×1 centimeter piece of glass and a second encapsulate sample dispersed in anhydrous chlorobenzene at 2000 RPM onto substrates consisting of single-sided copper adhesive tape affixed to a 1 centimeter×1 centimeter piece of glass. The encapsulate suspension is deposited dropwise onto the spinning substrate until the layer has thickened such that the copper foil is no longer visible through the encapsulate film. Encapsulate suspensions are vortex mixed for 30 seconds immediately prior to deposition to ensure homogeneity. Optical profilometry is used to determine the root mean square (RMS) roughness for each film. The film having the lower root mean square roughness is introduced into the XPS within 30 minutes to preclude significant oxidation in air, with XPS measurements commencing within 90 minutes.

All XPS spectra are collected using a monochromated Al source. First, ideal measurement regions are identified for each core and shell forming element present. These regions are selected to achieve as low of a binding energy as possible (to permit deep photoelectron escape) while still remaining deconvolutable from other elemental regions present. If it is necessary to perform deconvolution of elemental regions which overlap with other elemental regions, an independent, non-convoluted region is be chosen for the second element and used to constrain the peak-fit of the first element during software peak-fitting. High-resolution XPS spectra are then collected from each of these regions. In addition to collection of regions corresponding to metallic core/shell constituting elements present, a survey spectrum, the O1s region, and the C1s region are also collected.

To calculate the absolute thickness of the metal oxide shell surrounding the liquid metal core of the encapsulates, the following approach is used. First, the particle sizes are determined as previously described, and are reweighted to provide a surface-area weighted average which is used in these calculations. The identity of the core material is assumed based on redox and kinetic considerations, which may be bolstered by preliminary XPS analysis to determine the principal core and shell-forming elements present. The metal oxide shell is assumed to be stoichiometric for whatever oxide-forming element is present and the organic shell overlayer is assumed to have an atomic number of Z=4. The core is assumed to be constituted of the bulk alloy used to form the encapsulate. If spin-orbit components for a given elemental transition are convoluted, both are fitted by constraining the more convoluted peak area to the less convoluted peak area using spin-orbit splitting rules. If peaks due to spin-orbit splitting are not convoluted for a given elemental transition, only the larger peak is fitted. If multiple peaks arising from the same element are present in one transition (due to chemical state differences), all peaks are constrained to have identical full-width, half-maximum values. Values for binding energy shift may be taken from the NIST XPS Database to assist in deconvolution of multiple chemical states present in a given elemental transition, if necessary. If multiple values for the binding energy shift for a given chemical state of an element are present in the NIST XPS Database, the median value is used as the value for the binding energy shift. If no value is present in the NIST XPS Database for a given chemical state in a specific, desirable elemental transition, other literature values may be sought. Finally, appropriate lineshapes and background fits should be used, based on the manufacturer's specifications for the instrument.

Following tabulation of raw peak areas, these raw data are corrected based on the relative sensitivity factors for each elemental transition collected, based on published values from the manufacturer of the x-ray photoelectron spectrometer. Next, one of these corrected signals is selected which originates only from the core, one is selected which originates only from the oxide shell, and the C1s signal is assumed to originate only from the ligands and adventitious carbon overlayer. To prepare for shell thickness calculation, the following quantities are calculated:

$$L_{1,1} = 0.316 a_1^{3/2} \left\{ \frac{E_1}{Z_1^{0.45}[\ln(E_1/27)+3]} + 4 \right\}$$

$$B_{2,1} = (E_2/E_1)^{0.872}$$

$$B_{2,0} = (E_2/E_0)^{0.872}$$

$$C_{2,0} = (Z_2/Z_0)^{0.3}$$

$$C_{2,1} = (Z_2/Z_1)^{0.3}$$

$$L_{2,2} = L_{1,1}/(B_{2,1}C_{2,1})$$

where $Li_{1,1}$ represents the photoelectron attenuation length of a photoelectron of material 1 (oxide shell material) passing through material 1, $a_1$ represents the atomic size of material 1 in nanometers which for purposes of this test methods is 0.25 nanometers in all metal oxide cases, $E_i$ represents the photoelectron energy in electron volts of the photoelectron from material i, and $Z_i$ represents the number averaged atomic number for material i, where i may be 0 for the liquid core, 1 for the oxide shell, and 2 for the carbonaceous overlayer. B and C are useful parameters for later calculations, and describe the relative opacity of each layer (core, oxide shell, carbonaceous overlayer) in the encapsulate. Next, the photoelectron attenuation length for photoelectrons originating from material 2 passing through material 2, $L_{2,2}$, is calculated. Finally, starting from the relative sensitivity factor corrected peak areas, the following quantities are calculated:

$$A_{1,0} = I_1/I_0$$

$$A_{2,1} = I_2/I_1$$

$$A_{2,0} = I_2/I_0$$

where $A_{i,j}$ represents the ratio of the photoelectron signal originating from material i to that originating from material j, and L represents the relative sensitivity factor corrected photoelectron signal originating from material i.

To calculate the oxide shell thickness, $T_1$, and the carbonaceous overlayer thickness, $T_2$, the following iterative procedure is employed. $T_2$ is, for purposes of this test method, 0.1 nanometers. This value is converted into attenuation-length scaled units by dividing by $L_{2,2}$. Next, the value $A^*_{1,0}$ is calculated according to the equation:

$$A^*_{1,0} = A_{1,0}\{1+n[\ln(T_2+1)]\}e^{[(B_{2,1}-B_{2,0})T_2]}$$

where $$n = \frac{1}{20}[(2B_{2,1}-B_{2,0})(4.5+C_{2,1})+2(B_{2,0}-1)C_{2,1}+4.6]$$

followed by conversion of particle radius, R, from units of absolute length (nanometers or similar) to photoelectron attenuation length scale by division by $L_{1,1}$. Finally, a value for the oxide shell thickness, $T_1$, is calculated via the following set of equations:

$$T_{R\to\infty} = \frac{0.74A^{3.6}\ln(A)B^{-0.9} + 4.2AB^{-0.41}}{A^{3.6} + 8.9}$$

$$T_0 = R_{NP}\left[(ABC+1)^{\frac{1}{3}} - 1\right]$$

$$\alpha = \frac{1.8}{A^{0.1}B^{0.5}C^{0.4}}$$

$$\beta = \frac{0.13\alpha^{2.5}}{R_{NP}^{1.5}}$$

$$T_{R-1} = \frac{T_{R\to\infty}R}{R_{NP}+\alpha}$$

$$T_1 = \frac{T_{R\to\infty}R + \beta T_0}{1+\beta} \text{ where}$$

$$B = \frac{B_{2,0}}{B_{2,1}}$$

$$C = \frac{C_{2,0}}{C_{2,1}}$$

$$A = A^*_{1,0}$$

$$R_{NP} = R + T_1$$

The value for $T_1$ calculated in this manner is then converted from units of $L_{1,1}$ to units of $L_{2,2}$ by multiplying by $L_{2,2}/L_{1,1}$. Next, the following quantities are calculated:

$$A_{eff} = \frac{A_{2,1}A_{2,0}}{A_{2,1}+A_{2,0}}$$

$$B_{eff} = wB_{2,1} + (1-w)B_{2,0}$$

$$C_{eff} = wC_{2,1} + (1-w)C_{2,0}$$

where $$w = \frac{A_{1,0}}{A_{1,0} + 0.08 + 0.5B_{1,0}^4}$$

Next, the value for particle radius, R, is converted into units of $L_{2,2}$ by dividing R by L2,2. Finally, a new value for T2 is calculated via the following equations:

$$T_{R\to\infty} = \frac{0.74A^{3.6}\ln(A)B^{-0.9} + 4.2AB^{-0.41}}{A^{3.6} + 8.9}$$

$$T_0 = R_{NP}\left[(ABC+1)^{\frac{1}{3}} - 1\right]$$

-continued $$\alpha = \frac{1.8}{A^{0.1}B^{0.5}C^{0.4}}$$

$$\beta = \frac{0.13\alpha^{2.5}}{R_{NP}^{1.5}}$$

$$T_{R-1} = \frac{T_{R\to\infty}R}{R_{NP}+\alpha}$$

$$T_1 = \frac{T_{R\to\infty}R + \beta T_0}{1+\beta}$$

$$T_2 = \frac{T_{R\to\infty} + \beta T_0}{1+\beta} \text{ where}$$

$$A = A_{\mathit{eff}}$$

$$B = B_{\mathit{eff}}$$

$$C = C_{\mathit{eff}}$$

$$R_{NP} = R + T_1$$

and $R_{NP}$, $R$, and $T_1$ are expressed in units of $L_{2,2}$.

To converge on consistent values for $T_1$, the oxide shell thickness, and $T_2$, the carbonaceous shell thickness, the above procedure for calculating $T_1$ and $T_2$ is iterated on until the values for $T_1$ and $T_2$ converge across two cycles wherein the deviation between the two cycles is less than 0.01%. These values are then taken as the actual absolute thicknesses of the oxide shell and carbonaceous overlayer.

Low Frequency AC Conductivity After Elongation

AC transmission impedance measurements up to and including frequencies of 0.01 GHz are recorded using a precision impedance analyzer. The baseline impedance of the system including connectors and cables with no sample present is subtracted from the measured impedance during testing.

Stretchable conductor traces are prepared on taped sections of flat 2-hydroxyethyl acrylate substrates to produce a rectangular geometry (10 millimeters length by 4 millimeters wide with a thickness between 0.01 and 0.15 millimeters). Trace dimensions are measured using an optical profilometer and the thickness is calculated by comparing the average height of the trace to the average height of the underlying substrate. Single-sided copper adhesive tape is adhered directly onto the traces at each end, overlapping the encapsulate network by 2 millimeters to ensure good contact across the trace width.

Mechanical strain is applied to said stretchable conductor using a lead-screw driven biaxial stretching platform. Experiments are performed in uniaxial mode with an integrated, inline 10 newton tensile load cell (resolution=±0.05 newtons). Horizontally opposed, self-tightening grips comprising a metallic body, with a uniform clamping force from an internally mounted torsional spring, are used to mount the samples. Test samples are clamped at the inner edges of the copper tape.

High Frequency AC Conductivity After Elongation

AC impedance measurements from frequencies above 0.01 GHz up to and including 20 GHz are measured using a vector network analyzer (VNA). The effects of the cables and connectors are calibrated out of the measurement prior to electrical characterization.

Stretchable co-planar waveguide (CPW) geometry transmission lines are prepared by patterning the liquid metal encapsulate network on taped sections of flat 2-hydroxyethyl acrylate substrates to produce a rectangular geometry (10 millimeters length by 4 millimeters wide with a thickness between 0.01 and 0.15 millimeters). Trace dimensions are measured using an optical profilometer and the thickness is calculated by comparing the average height of the trace to the average height of the underlying substrate. Single-sided copper adhesive tape is adhered directly onto the traces at each end, overlapping the encapsulate network by 2 millimeters to ensure good contact across the trace width.

Figure 2:
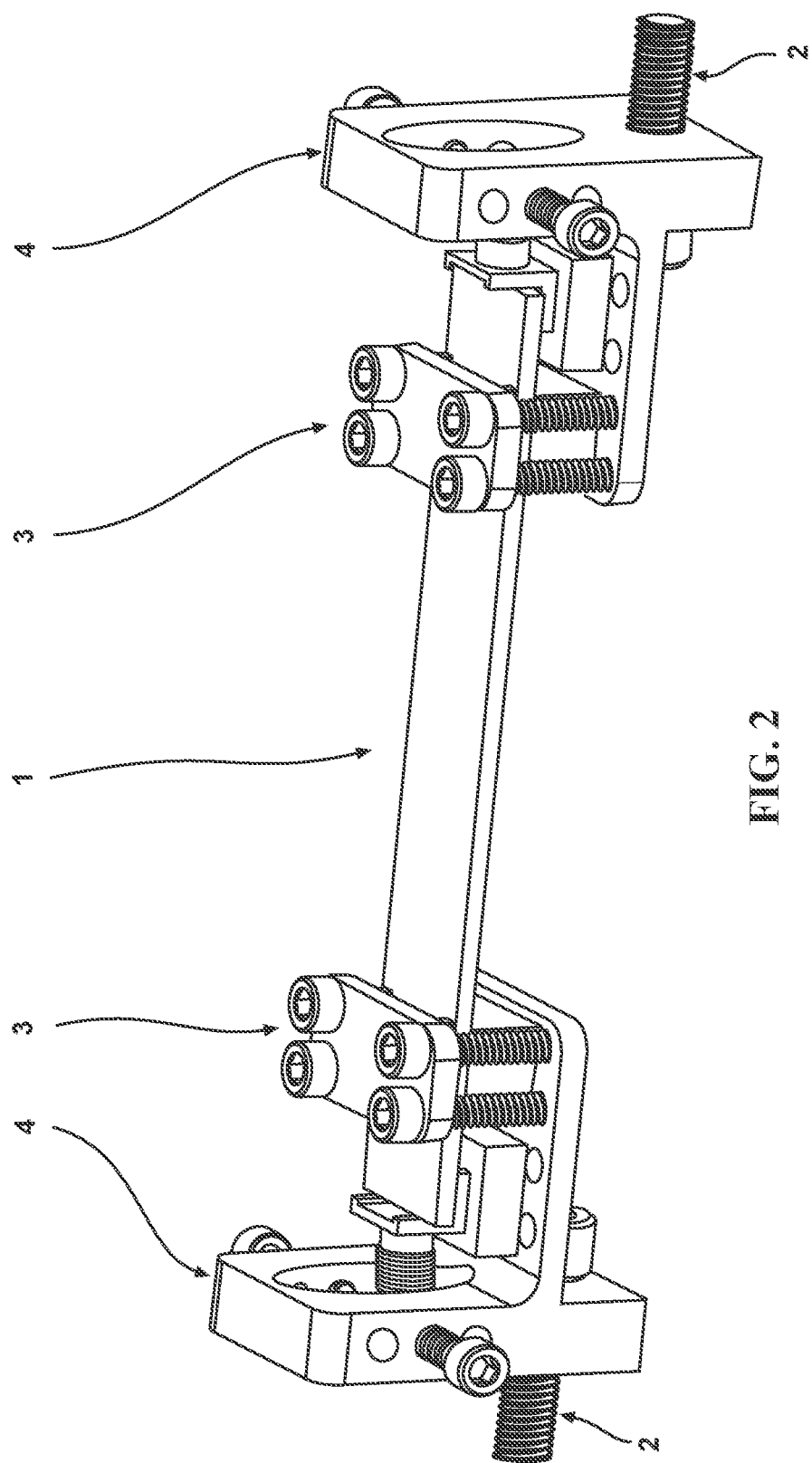
FIG. 2 is an isometric view of a conductive material under test (MUT) 1 that is affixed between two clamping fixtures comprising bolts affixing clamping jig to mechanical stretching apparatus 2, bolts affixing clamping jig to mechanical stretching apparatus 3 and bolts affixing clamping jig to mechanical stretching apparatus 4.
Figure 3:
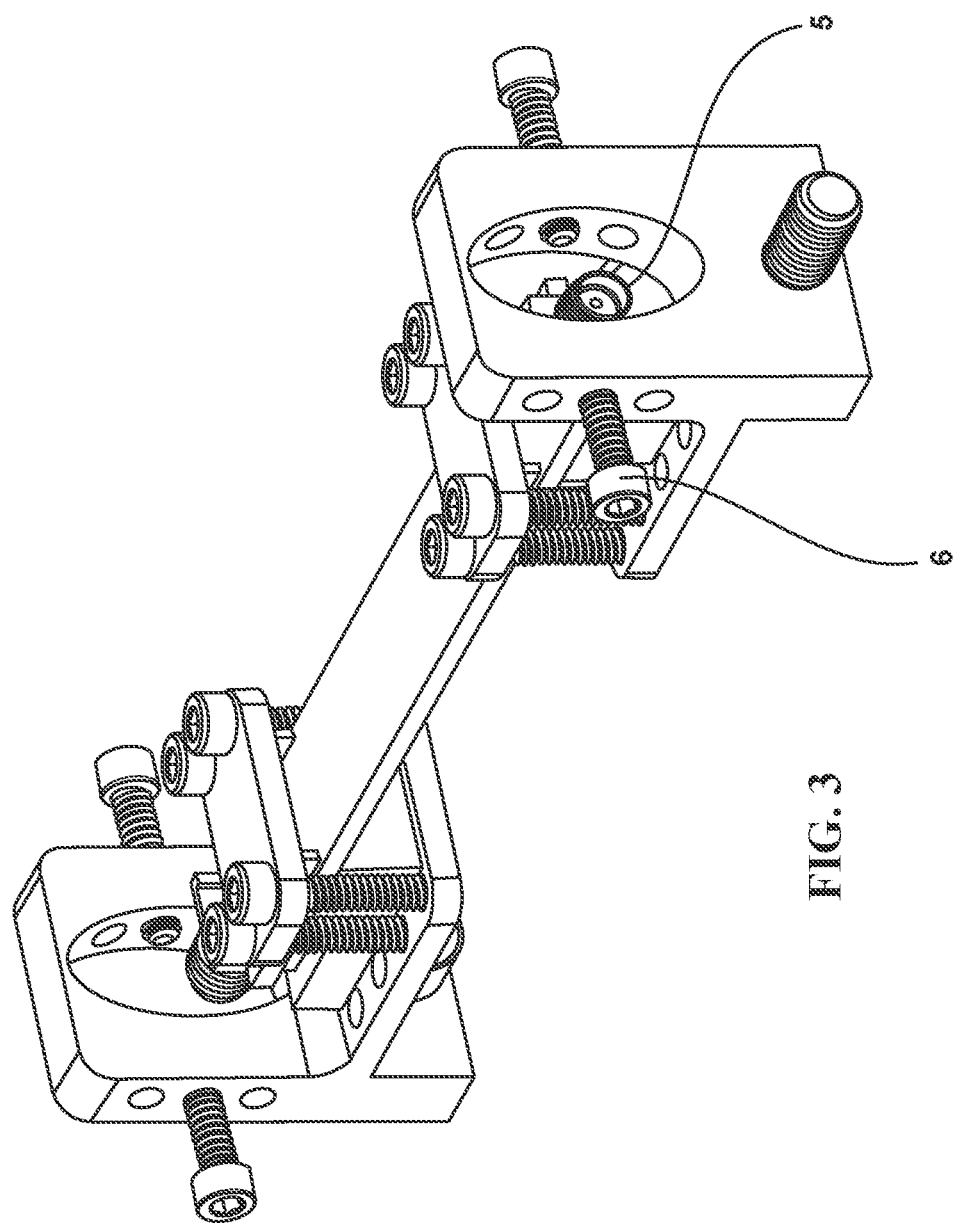
FIG. 3 is a posterior isometric view of a MUT within clamping fixtures showing bolts affixing clamping jig to mechanical stretching apparatus 5 and set screws to affix the position of RF connectors and RF measurement cables 6.

Specifically designed clamps, shown in FIGS. 2-4, are used to isolate sources of RF impedance measurement error associated with unintended displacement and strain of the conductive material, connectors, and external cabling during testing. FIG. 2 shows the MUT (1) held in tension by the clamping fixtures (4) with the immobilizing compressive clamping force provided by adjustable clamping counter-faces (3). The clamping fixtures (4) are attached to an external source of mechanical strain (tension, bending, and/or torsion) using threaded connectors (2). FIG. 3 shows the connectors (5) for external coaxial cable connection to the electronic analyzer. Set screws (6) are used to firmly hold said external cables firmly in place during testing and application of mechanical strains to the MUT (1), preventing undesired translation or bending of the cables. FIG. 4 shows the top clamping counterface (7) whose geometry can be customized depending on the device architecture to avoid making direct physical contact with conductive features of the MUT (1) which can lead to measurement error and/or device failure.

For the case of uniaxial tensile testing of stretchable CPW transmission lines, clamping fixtures shown in FIGS. 2-4 are connected to a lead-screw driven biaxial stretching platform, in uniaxial mode with an integrated, inline 10 newton tensile load cell (resolution=±0.05 newtons). CPW adapters are used to connect to the MUT (1) and a VNA.

In Situ Repeatable Low Frequency Impedance Variation Under Strain

In situ AC transmission impedance measurements up to and including frequencies of 0.01 GHz are recorded using a precision impedance analyzer while the liquid metal encapsulate network undergoes strain. The baseline impedance of the system including connectors and cables with no sample present is subtracted from the measured impedance during testing. Cyclic tests to determine repeatability are performed to 1000 strain cycles.

The repeatability of impedance variation under strain is determined through monotonic and cyclic electromechanical experiments. Low frequency test samples consisting of single traces (15 millimeters×4 millimeters×0.1 millimeters) of stretchable conductor networks drop cast across the gauge length (20 millimeters×4 millimeters) of 2-hydroxyethyl acrylate 'dog-bone' tensile specimens are used. Single-sided copper adhesive tape (3M, ¼ inch width) is adhered directly onto the trace at each end, overlapping the encapsulate network a few millimeters to ensure good contact across the trace width. A single droplet of liquid metal (50 microliters) is spotted on the interfaces between the copper tape and stretchable conductor trace to further enhance electrical contact and retain said contact throughout the test, especially at high strains.

Electromechanical testing is performed using a lead-screw driven biaxial stretching platform. Experiments are performed in uniaxial mode with an integrated, inline 10 newton tensile load cell (resolution=±0.05 newtons). Horizontally opposed, self-tightening grips comprising a metallic body, with a uniform clamping force from an internally mounted torsional spring, are used to mount the samples. Test samples are clamped at the edges of the copper tape. Electrical leads are connected to the metallic grips using alligator-style clips. Prior to the application of tensile strain, test samples are preloaded to 0.1 newtons to remove any slack in the sample length.

In Situ Repeatable High Frequency Impedance Variation Under Strain

In situ AC impedance measurements from frequencies above 0.01 GHz up to and including 20 GHz are measured using a VNA. The effects of the cables and connectors are calibrated out of the measurement prior to electrical characterization. Cyclic tests to determine repeatability are performed to 1000 strain cycles.

The repeatability of impedance variation under strain is determined through monotonic and cyclic electromechanical experiments. High frequency liquid metal encapsulate network test samples patterned in co-planar waveguide (CPW) geometry transmission lines are prepared by patterning the liquid metal encapsulate network across the gauge length of a flat 2-hydroxyethyl acrylate 'dog-bone' geometry substrates (10 millimeters long by 4 millimeters wide with a thickness between 0.01 and 0.15 millimeters). Trace dimensions are measured using an optical profilometer and the thickness is calculated by comparing the average height of the trace to the average height of the underlying substrate. Single-sided copper adhesive tape is adhered directly onto the waveguide liquid metal encapsulate network at each end, overlapping the encapsulate network by 2 millimeters to ensure good contact across the trace width.

Specifically designed clamps, shown in FIGS. 2-4, are used to isolate sources of RF impedance measurement error associated with unintended displacement and strain of the conductive material, connectors, and external cabling during testing. FIG. 2 shows the MUT (1) held in tension by the clamping fixtures (4) with the immobilizing compressive clamping force provided by adjustable clamping counterfaces (3). The clamping fixtures (4) are attached to an external source of mechanical strain (tension, bending, and/or torsion) using threaded connectors (2). FIG. 3 shows the connectors (5) for external coaxial cable connection to the electronic analyzer. Set screws (6) are used to firmly hold said external cables firmly in place during testing and application of mechanical strains to the MUT (1), preventing undesired translation or bending of the cables. FIG. 4 shows the top clamping counterface (7) whose geometry can be customized depending on the device architecture to avoid making direct physical contact with conductive features of the MUT (1) which can lead to measurement error and/or device failure.

For the case of uniaxial tensile testing of stretchable CPW transmission lines, clamping fixtures shown in FIGS. 2-4 are connected to a lead-screw driven biaxial stretching platform, in uniaxial mode with an integrated, inline 10 newton tensile load cell (resolution=±0.05 newtons). CPW adapters are used to connect to the MUT (1) and a VNA. Prior to the application of tensile strain, test specimens are preloaded to 0.1 newtons to remove any slack in the sample length.

EXAMPLES

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1 Production of 11-Phosphonoundecyl Acrylate Functionalized EGaIn Liquid Metal Encapsulates Gallium and Indium were combined to produce a eutectic liquid alloy of GaIn (14.2 atom % In, 85.8 atom % Ga). A total of 9 milligrams of the ligand 11-phosphonoundecyl acrylate was dissolved in 10 milliliters of ethanol (200 proof, anhydrous USP) and added to a 20 milliliters glass vial containing 200 milligrams of the GaIn alloy. The mixture was sonicated in an ultrasonic bath at 45° C. for two hours to produce GaIn particles having a number average diameter of about 3 microns. The resulting colloidal solution was centrifuged at 2600 RCF for 3 minutes and the supernatant was removed and replaced. This process was repeated three times, after which the particles were suspended in 4 milliliters of ethanol.

Example 2 Production of 12-Azidododecylphosphonic acid Functionalized EGaIn Liquid Metal Encapsulates To produce nanoscale EGaIn-based liquid metal encapsulates functionalized with 12-azidododecylphosphonic acid, a multi-functional ligand molecule, 0.1 milliliters of EGaIn (14.2 atom % In, 85.8 atom % Ga) was placed into a 20 milliliter, 28 millimeter outer diameter borosilicate glass scintillation vial containing 14.9 milliliters of absolute ethanol. A 3 millimeter ultrasonic probe microtip driven by a Sonics and Materials, Inc. VCX500 ultrasonic processor was then immersed approximately half of the vial height into the ethanol. Parafilm was then used to seal the vial opening as completely as possible to minimize solvent loss during ultrasonication. Sonication was then carried out for two hours at an amplitude of 17% while the vial temperature was held constant at a temperature of 10° C. using a water bath to produce nanoscale EGaIn particles having a number average diameter of about 160 nanometers. Following ultrasonication, the vial of EGaIn encapsulate suspension was removed from the ultrasonication apparatus and 17 milligrams of 12-azidododecylphosphonic acid was added to the vial. The vial was then sealed with its cap and placed into a bath sonicator held at a temperature of 45° C. and sonicated for 30 minutes to bond phosphonic acid ligands to the EGaIn particle surface. Following the ligand attachment step, excess ligands were removed from solution by a series of centrifugation and washing steps where the particle suspension was placed into a centrifugation tube and spun at 8229 RCF for 20 minutes, after which the supernatant is decanted and the encapsulate sediment is redispersed into a 3:1 (v:v) mixture of chlorobenzene:methanol. This process is repeated three times before a final redispersion of the encapsulate particles into 3:1 chlorobenzene:methanol.

Example 3 Production of (3-glycidyloxypropyl) triethoxysilane Functionalized EGaIn Liquid Metal Encapsulates (3-glycidyloxypropyl) triethoxysilane functionalized EGaIn liquid metal encapsulates were produced in the same way as 12-azidododecylphosphonic acid functionalized encapsulates, except, 1 milliliters of (3-glycidyloxypropyl) triethoxysilane was used per 10 milliliters of solvent and the particle suspension was stirred at ambient temperature for 16 hours after addition, rather than 30 minutes of bath sonication. Excess ligand was removed from solution by three centrifugation/wash steps at 8229 RCF for 20 minutes with chlorobenzene. The final particles produced in this manner were redispersed into chlorobenzene for later use.

Example 4 Production of 11-Mercaptoundecanoic acid Functionalized EGaIn Liquid Metal Encapsulates 11-mercaptoundecanoic acid functionalized particles were made by placing 0.1 milliliters of EGaIn liquid metal into a 20 milliliter, 28 millimeter outer diameter borosilicate scintillation vial. To this vial was added 14.9 milliliters of a 64 millimolar solution of 11-mercaptoundecanoic acid in absolute ethanol. A 3 millimeter ultrasonic probe microtip driven by a Sonics and Materials, Inc. VCX500 ultrasonic processor was then immersed approximately half of the vial height into the ethanol. Parafilm was then used to seal the vial opening as completely as possible to minimize solvent loss during ultrasonication. Sonication was then carried out for sixteen hours at an amplitude of 30% while the vial temperature was held constant at a temperature of 10° C. using a water bath to produce nanoscale EGaIn particles having a number average diameter of about 60 nanometers. Excess ligand was removed from solution by a series of centrifugation/redispersion steps in which the particle suspension was centrifuged at 8229 RCF for 30 minutes to sediment the particles, followed by redispersion in fresh absolute ethanol. These steps were repeated three times before a final redispersion into absolute ethanol. Particles produced in this manner had a number averaged diameter of about 60 nanometers and a gallium oxide shell thickness of about 1.2-1.3 nanometers.

Example 5 Production of 4-Aminophenyl propargyl ether Functionalized EGaIn-based Liquid Metal Encapsulates 4-Aminophenyl propargyl ether functionalized EGaIn particles are made as in Example 4 for EGaIn particles functionalized with 11-mercaptoundecanoic acid, except, 4-aminophenyl propargyl ether is substituted for 11-mercaptoundecanoic acid wherever 11-mercaptoundecanoic acid is used in the procedure.

Example 6 Production of 12-Azidododecylphosphonic acid Functionalized Ga—In—Sn Alloy Liquid Metal Encapsulates Ga—In—Sn alloy (68.5 wt % Ga, 21.5 wt % In, 10 wt % Sn) liquid metal particles functionalized with 12-azidododecylphosphonic acid are made as in Example 2 for EGaIn particles functionalized with 12-azidododecylphosphonic acid, except, Ga—In—Sn alloy (68.5 wt % Ga, 21.5 wt % In, 10 wt % Sn) liquid metal is substituted for EGaIn wherever EGaIn is used.

Example 7 Production of (3-glycidyloxypropyl) triethoxysilane Functionalized Ga—In—Sn Alloy Liquid Metal Encapsulates Ga—In—Sn alloy (68.5 wt % Ga, 21.5 wt % In, 10 wt % Sn) liquid metal particles functionalized with (3-glycidyloxypropyl) triethoxysilane are made as in Example 3 for EGaIn particles functionalized with (3-glycidyloxypropyl) triethoxysilane, except, Ga—In—Sn alloy (68.5 wt % Ga, 21.5 wt % In, 10 wt % Sn) liquid metal is substituted for EGaIn wherever EGaIn is used.

Example 8 Production of 11-Mercaptoundecanoic acid Functionalized Ga—In—Sn Alloy Liquid Metal Encapsulates Ga—In—Sn alloy (68.5 wt % Ga, 21.5 wt % In, 10 wt % Sn) liquid metal particles functionalized with 11-mercaptoundecanoic acid were made as in Example 4 for EGaIn particles functionalized with 11-mercaptoundecanoic acid, except, Ga—In—Sn alloy (68.5 wt % Ga, 21.5 wt % In, 10 wt % Sn) liquid metal is substituted for EGaIn wherever EGaIn is used.

Example 9 Production of 4-Aminophenyl propargyl ether Functionalized Ga—In—Sn Alloy Liquid Metal Encapsulates Ga—In—Sn alloy (68.5 wt % Ga, 21.5 wt % In, 10 wt % Sn) liquid metal particles functionalized with 4-aminophenyl propargyl ether are made as in Example 5 for EGaIn particles functionalized with 4-aminophenyl propargyl ether, except, Ga—In—Sn alloy (68.5 wt % Ga, 21.5 wt % In, 10 wt % Sn) liquid metal is substituted for EGaIn wherever EGaIn is used.

Example 10 Production of 12-Azidododecylphosphonic acid Functionalized Field's metal Liquid Metal Encapsulates Field's metal (32.5 wt % Bi, 51 wt % In, 16.5 wt % Sn) liquid metal particles functionalized with 12-azidododecylphosphonic acid are made as in Example 2 for EGaIn particles functionalized with 12-azidododecylphosphonic acid, except, Field's liquid metal alloy is substituted for EGaIn wherever EGaIn is used, the bath temperature for ultrasonication is held at 65° C., and ethylene glycol is used as solvent in place of ethanol.

Example 11 Production of (3-glycidyloxypropyl) triethoxysilane Functionalized Field's metal Liquid Metal Encapsulates Field's metal (32.5 wt % Bi, 51 wt % In, 16.5 wt % Sn) liquid metal particles functionalized with (3-glycidyloxypropyl) triethoxysilane are made as in Example 3 for EGaIn particles functionalized with (3-glycidyloxypropyl) triethoxysilane, except, Field's liquid metal alloy is substituted for EGaIn wherever EGaIn is used, the bath temperature for ultrasonication is held at 65° C., and ethylene glycol is used as solvent in place of ethanol.

Example 12 Production of 11-Mercaptoundecanoic acid Functionalized Field's metal Liquid Metal Encapsulates Field's metal (32.5 wt % Bi, 51 wt % In, 16.5 wt % Sn) liquid metal particles functionalized with 11-mercaptoundecanoic acid are made as in Example 4 for EGaIn particles functionalized with 11-mercaptoundecanoic acid, except, Field's liquid metal alloy is substituted for EGaIn wherever EGaIn is used, the bath temperature for ultrasonication is held at 65° C., and ethylene glycol is used as solvent in place of ethanol.

Example 13 Production of 4-Aminophenyl propargyl ether Functionalized Field's metal Liquid Metal Encapsulates Field's metal (32.5 wt % Bi, 51 wt % In, 16.5 wt % Sn) liquid metal particles functionalized with 4-aminophenyl propargyl ether are made as in Example 5 for EGaIn particles functionalized with 4-aminophenyl propargyl ether, except, Field's liquid metal alloy is substituted for EGaIn wherever EGaIn is used, the bath temperature for ultrasonication is held at 65° C., and ethylene glycol is used as solvent in place of ethanol.

Example 14 Production of Covalently-linked Triazole-containing Networks from 12-Azidododecylphosphonic acid Functionalized EGaIn Liquid Metal Encapsulates 12-Azidododecylphosphonic acid functionalized EGaIn liquid metal encapsulates are produced as described in Example 2. To this particle suspension is added 6.18 microliters of propargyl ether, followed by the addition of 2.4 milligrams sodium ascorbate and 1 milligram of copper (II) sulfate pentahydrate. This mixture is then pipetted onto a stretchable substrate and allowed to dry before activation of the electrical conductivity of the network via stretching.

Example 15 Production of 3-(Trimethoxysilyl)propyl Methacrylate Functionalized EGaIn Liquid Metal Encapsulates 3-(trimethoxysilyl)propyl methacrylate functionalized EGaIn liquid metal encapsulates were produced in the same way as Example 1, except, 1 milliliter of 3-(trimethoxysilyl)propyl methacrylate was used in place of 9 milligrams of 11-phosphonoundecyl acrylate.

Example 16 Production of Cross-linked Particle Networks in Ethanol based on 11-Phosphonoundecyl Acrylate Functionalized EGaIn Liquid Metal Encapsulates 3 milligrams of photoinitiator phenylbis(2,4,6-trimethylbenzoyl) phosphine oxide was added to a 4 milliliters solution of ethanol and 200 milligrams of eutectic GaIn particles functionalized with 11-phosphonoundecyl acrylate according to Example 1. The mixture was exposed to 94.125 milliwatts per square centimeter of 365 nanometers wavelength light for 180 seconds to cross-link particles together and form a network.

Example 17 Production of Cross-linked Particle Networks in DMSO based on 11-Phosphonoundecyl Acrylate Functionalized EGaIn Liquid Metal Encapsulates 4 milligrams of photoinitiator phenylbis(2,4,6-trimethylbenzoyl) phosphine oxide was added to a 2 milliliter solution of DMSO and 200 milligrams of eutectic GaIn particles functionalized with 11-phosphonoundecyl acrylate according to Example 1. The mixture was exposed to 94.125 milliwatts per square centimeter of 365 nanometer wavelength light for 180 seconds to cross-link particles together and form a network.

Example 18 Production of Substrate Bound Cross-linked Particle Networks based on 11-Phosphonoundecyl Acrylate Functionalized EGaIn Liquid Metal Encapsulates 3 milligrams of photoinitiator phenylbis(2,4,6-trimethylbenzoyl) phosphine oxide was added to a 4 milliliter solution of ethanol and 200 milligrams of eutectic GaIn particles functionalized with 11-phosphonoundecyl acrylate according to Example 1. This solution was drop cast onto an elastomer substrate comprising 2-hydroxyethyl acrylate. When the agglomerate appeared visually dry, 365 nanometer wavelength light was irradiated from underneath the substrate for 180 seconds at an intensity of 94.125 milliwatts per square centimeter to cross-link the particles into a network which also has linkages to the elastomer substrate.

Example 19 Production of Substrate Bound Cross-linked Particle Networks based on 3-(Trimethoxysilyl)propyl Methacrylate Functionalized EGaIn Liquid Metal Encapsulates 4 milligrams of photoinitiator phenylbis(2,4,6-trimethylbenzoyl)phosphine oxide was added to a 2 milliliter solution of ethanol and 200 milligrams of eutectic GaIn particles functionalized with 3-(trimethoxysilyl)propyl methacrylate according to Example 15. This solution was drop cast onto an elastomer substrate comprising 2-hydroxyethyl acrylate. When the agglomerate appeared visually dry, 365 nanometer wavelength light was irradiated from underneath the substrate for 180 seconds at an intensity of 94.125 milliwatts per square centimeter to cross-link the particles into a network which also has linkages to the elastomer substrate.

Example 20 Production of Cross-linked Particle Networks in Tetrahydrofuran based on (3-Glycidyloxypropyl) Triethoxysilane Functionalized EGaIn Liquid Metal Encapsulates 2 milligrams of a 50 wt % solution of photoinitiator triarylsulfonium hexafluoroantimonate in propylene carbonate is added to a 4 milliliter solution of tetrahydrofuran and 200 milligrams of eutectic GaIn particles functionalized with (3-glycidyloxypropyl) triethoxysilane prepared according to Example 3. This solution is exposed to 94.125 milliwatts per square centimeter of 365 nanometer wavelength light for 180 seconds to cross-link particles together.

Example 21 Production of Activated Particle Networks based on 11-Phosphonoundecyl Acrylate Functionalized EGaIn Liquid Metal Encapsulates in Ethanol Cross-linked particle networks prepared according to Example 16 are drop cast onto an elastomer substrate comprising 2-hydroxyethyl acrylate and the solvent is allowed to dry. When the substrate is stretched, a conductivity increase is observed in the particle network over a uniaxial elongation of about 50% to 125%.

Example 22 Production of Activated Particle Networks based on 11-Phosphonoundecyl Acrylate Functionalized EGaIn Liquid Metal Encapsulates in DMSO Cross-linked particle networks prepared according to Example 17 are drop cast onto an elastomer substrate comprising 2-hydroxyethyl acrylate and the solvent is allowed to dry. When the substrate is stretched, a conductivity increase is observed in the particle network over a uniaxial elongation of about 50% to 125%.

Example 23 Use of Cross-linked Liquid Metal Particle Networks as a Passive Strain Monitor with Active Sensing Cross-linked particle networks prepared according to Example 17 are drop cast onto an elastomer substrate comprising 2-hydroxyethyl acrylate and the system is heated until dry. The system is optionally encapsulated and then the 2-hydroxyethyl acrylate substrate is adhered to an element of interest capable of undergoing strain and being of higher modulus than the substrate. The cross-linked particle network is electrically connected in line with a circuit that is also connected to a power source and an element capable of indicating, such as a light or communication module. When the element of interest undergoes sufficient strain the cross-linked particle network will greatly increase in conductivity which can be observed as a change to a circuit or a change in free space back scattered radiation patterns.

Example 24 Use of Cross-linked Liquid Metal Particle Networks as a Passive Strain Monitor Cross-linked particle networks prepared according to Example 17 are drop cast onto an elastomer substrate comprising 2-hydroxyethyl acrylate in a radio-frequency identification (RFID) antenna pattern and the system is heated until dry. The system is optionally encapsulated and then the 2-hydroxyethyl acrylate substrate is adhered to an element of interest capable of undergoing strain and being of higher modulus than the substrate. When the element of interest undergoes sufficient strain the cross-linked particle network will greatly increase in conductivity and be readable by an RFID reader.

Example 25 Use of Cross-linkable Liquid Metal Encapsulates for Ink-Jet and/or Aerosol Jet Printing and Subsequent Network Formation Liquid metal encapsulates are prepared according to Example 7 and diluted with n-methyl-2-pyrrolidone such that the encapsulates are suspended in a solution of 75% by volume ethanol and 25% by volume n-methyl-2-pyrrolidone. To this solution is added 4% by weight of a solution of triarylsulfoniumhexafluoroantimonate in propylene carbonate (50/50 by weight). This solution is then Ink-Jet printed or Aerosol Jet printed with a thickness between 1-100 microns and exposed to 94.125 milliwatts per square centimeter of 365 nanometer wavelength light for 180 seconds to cross-link particles together.

Example 26 Production of Patterned and Substrate Bound Cross-linked Liquid Metal Particle Networks based on 11-Phosphonoundecyl Acrylate Functionalized EGaIn Liquid Metal Encapsulates 3 milligrams of photoinitiator phenylbis(2,4,6-trimethylbenzoyl)phosphine oxide was added to a 4 milliliter solution of ethanol and 200 milligrams of eutectic GaIn particles functionalized with 11-phosphonoundecyl acrylate according to Example 1. This solution was drop cast onto an elastomer substrate comprising 2-hydroxyethyl acrylate. When the agglomerate appeared visually dry, 365 nanometer wavelength light was irradiated in a pattern from underneath the substrate for 180 seconds at an intensity of 94.125 milliwatts per square centimeter to selectively cross-link the particles into a network which also has linkages to the elastomer substrate.

Example 27 Use of Activated Particle Networks as a Radio Frequency Antenna that can be Physically Modified to Tune the Antenna Performance Activated particle networks prepared according to Example 22 are fashioned into an antenna design or used as part of an antenna design and connected with a source capable of generating radio frequency waves or receiving radio frequency waves. As the particle network is elongated and physically modified the frequency, polarization, gain and/or directionality is also modulated due to activation of the particles within the network rupturing and forming new connections or by physically changing the dimensions of the antenna which correlate directly to its performance.

Example 27 Use of Activated Particle Networks as a Stretchable Inductor that can be Physically Tuned Activated particle networks prepared according to Example 22 are fashioned into traces such that they generate an inductance. Physical perturbation of the inductor manipulates the geometry and in turn modifies the inductance of the traces.

Example 28 Use of Activated Particle Networks as a Stretchable Inductor that can Harvest Electrical Energy from an Oscillating Magnetic Field Activated particle networks prepared according to Example 22 are fashioned into traces such that they have an inductance. A changing magnetic field is applied to the activated particle networks in either a stretched or non-stretched state to induce a current via electromagnetic induction. As the particle network is elongated and physically modified the inductance and/or inductive coupling to a nearby circuit is also modulated.

Example 29 Use of Activated Particle Networks as a Stretchable Capacitor that can be Physically Tuned Activated particle networks prepared according to Example 22 are fashioned into parallel elements such that the separation between the elements relative to the surface area of the elements closest shared face is small. An AC voltage is applied to the activated particle networks in either a stretched or non-stretched state. As the particle network is elongated and physically modified the capacitance and/or capacitive coupling to a nearby circuit is also modulated.

Example 30 Use of Activated Particle Networks as a Stretchable Conductor for Consistent AC Power Delivery Activated particle networks prepared according to Example 22 are connected with both a power source and an electrical device such that the activated particle network may stretch during operation. Transmission of AC current from the power source to the electrical device is predictable as the activated particle network is stretched between 1-10% elongation.

Example 31 Use of Cross-linked Particle Networks as a Push-to-Connect Compliant AC Interconnect Cross-linked particle networks prepared according to Example 17 are drop cast between two or more electrical elements such that the cross-linked particle networks make physical contact with said electrical elements and span the distance between them. Compressive force is applied through a low-surface energy material onto said cross-linked particle networks such that said particles of the network rupture to form an electrically conductive wire spanning said electrical elements.

Example 32 Use of Cross-linked Particle Network as a Mechanically Graded Compliant AC Interconnect Particles prepared according to Example 1 are drop cast between two or more electrical elements such that the non-crosslinked particle film makes physical contact with said electrical elements and spans the distance between them. Cross-linking of the particles is performed according to Example 26 except the particle encapsulates are exposed to a variation in light intensity spatially, resulting in a variation in cross-linking density, resulting in graded mechanical properties of the cross-linked particle network serving as the AC interconnect.

Example 33 Use of Cross-linked Particle Networks as a Damage Healing Element for AC Conductors Cross-linked particle networks prepared according to Example 17 are drop cast onto an AC conductive element. A damaging force which compromises the electrical integrity of the underlying conductive element is applied such that the cross-linked particle networks rupture. After removal of the damaging force the ruptured particles connect undamaged areas of the conductive element to restore conductivity across the conductive element.

Example 34 Use of Cross-linked Particle Networks as Tunable Transmission Lines for Impendence Matching via Physical Manipulation of Network Cross-linked particle networks prepared according to Example 17 are patterned with specified widths into a RF transmission line coplanar waveguide geometry which are modulated by mechanical strain to modify the width and length of said transmission line in order to alter the impedance match between two circuits.

Example 35 Use of Cross-linked Particle Networks as a Tunable Loss Transmission Line Cross-linked particle networks prepared according to Example 17 are patterned with specified widths into a RF transmission line coplanar waveguide geometry which are modulated by mechanical strain to modify the intrinsic loss of the liquid metal encapsulate network under various strain profiles.

Example 36 Use of Patterned Cross-linked Particle Network for AC Transmission Lines Requiring Two or More Compliant Conductors Separated by a Compliant Dielectric Patterned liquid metal encapsulates prepared according to Example 26 with cross-linked conductive encapsulate networks separated by non-cross-linked dielectric encapsulates which behave as a stretchable RF coplanar waveguide.

Example 37 Use of Cross-linked Particle Networks as a Responsive RF Switch Cross-linked particle networks prepared according to Example 17 are patterned with a width of 100 microns into a RF transmission line coplanar waveguide geometry which is not activated and serves as a dielectric of high resistance. Upon applied mechanical strain the liquid metal encapsulate network is activated and becomes conductive, allowing current to flow and switching the circuit from resistive to conductive.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An article comprising at least one conductive material and at least one dielectric material, said conductive material and/or said dielectric material comprising an activated core shell liquid metal encapsulate network when said core shell liquid metal encapsulate network material is the conductive material and an unactivated core shell liquid metal encapsulate network when said core shell liquid metal encapsulate network is the dielectric material, said at least one conductive material being capable of conducting alternating current greater than 0 GHz to about 20 GHz, said at least one dielectric material having a resistivity greater than or equal to 100,000 ohms-meter to said alternating current, said core shell liquid metal encapsulate network comprising a plurality of encapsulates, said encapsulates comprising a liquid metal core having an external surface, a metal oxide shell that encapsulates said liquid metal core, said shell having an external shell surface; and one or more multi-functional ligands covalently bound to said shell's external surface and/or coordinatively bound to said liquid metal core's external surface; said encapsulates' being chemically bound via a linkage comprising a residue of ligands of said encapsulates to the external shell of an encapsulate other than the external shell of the encapsulate to which said ligands were originally covalently or coordinatively bound thus forming said core shell liquid metal encapsulate network:
   a) said encapsulates' liquid metal core comprises a liquid metal selected from the group consisting of Hg, Pb, Sn, Sb, Cd, Bi, Ga, In, Al, Zn, Ag, Au, Tl and mixtures thereof;
   b) said encapsulates' shell material comprises a metal oxide comprising a cation derived from a metal selected from the group consisting of Ga, In, Sn, Pb, Sb, Cd, Al, Zn, Tl, Bi, Ca, Sc, Ti, V, Cr, Sr, Y, Zr, Nb, Mo, Te, Gd, Hf, Pr, Nd, Pt, Sm, Eu, Dy, Ho, Er, Yb, Pu and mixtures thereof; and
   c) said encapsulates' one or more multi-functional ligands comprising a head group that comprises a material selected from the group consisting of thiols, amines, phosphonic acids, alkoxysilanes, halosilanes, carboxylic acids, nitriles, and mixtures thereof.

2. An article according to claim 1, wherein:
   a) said encapsulates' liquid metal core comprises a liquid metal selected from the group consisting of Ga, In, Sn, Bi, Pb, Cd, Sb and mixtures thereof;
   b) said encapsulates' shell material comprises a metal oxide comprising a cation derived from a metal selected from the group consisting of Ga, Al, Zn, Sc, Ti, Cr, Zr, Nb, Gd, Nd, Sm and mixtures thereof; and
   c) said encapsulates' one or more multi-functional ligands comprising a head group that comprises a material selected from the group consisting of thiols, phosphonic acids, trialkoxysilanes, trichlorosilanes, and mixtures thereof.

3. An article according to claim 2, wherein:
   a) said encapsulates' liquid metal core comprises a liquid metal selected from the group consisting of Ga, In, Sn, Bi, Sb and mixtures thereof;
   b) said encapsulates' shell material comprises a metal oxide comprising a cation derived from a metal selected from the group consisting of Ga, Al, Zn, Gd, Nd and mixtures thereof; and
   c) said encapsulates' one or more multi-functional ligands comprising a head group that comprises a material selected from the group consisting of thiols, trialkoxysilanes or phosphonic acids, and one or more additional moieties selected from the group consisting of a hydrosilane, a cyclic ester, an azide, an alcohol, an alkyne, an alkene, an isocyanate, a conjugated diene, an imine, a boronate ester, a conjugated ring, a carboxylic acid, an amine, a thiol, a phosphonic acid, an alkoxysilane, a halosilane, a nitrile and mixtures thereof.

4. An article according to claim 3, wherein:
   a) said encapsulates' liquid metal core comprises a liquid metal selected from the group consisting of Ga, In and mixtures thereof; and
   c) said encapsulates' one or more multi-functional ligands comprising a head group that comprises a material selected from the group consisting of 11-phosphonoundecyl acrylate, 3-(trimethoxysilyl)propyl acrylate, 3-(trimethoxysilyl)propyl methacrylate, (3-glycidyloxypropyl) triethoxysilane, 3-(triethoxysilyl)propyl isocyanate, 12-azidododecylphosphonic acid, trimethoxy[2-(7-oxabicyclo[4.1.0]hept-3-yl)ethyl]silane, 3-cyclopentadienylpropyltriethoxysilane, [(5-bicyclo[2.2 0.1]hept-2-enyl)ethyl]triethoxysilane, 11-phosphonoundecanoic acid, and mixtures thereof.

5. The article according to claim 1 wherein;
   a) said encapsulates' liquid metal core comprises a liquid metal alloy selected from the group consisting of Ga/In, Ga/In/Sn, Ga/In/Sn/Sb, In/Sn/Bi, Bi/Pb/Sn, Bi/Pb/Sn/Cd, Bi/Pb/Sn/Cd/In and mixtures thereof;
   b) said encapsulates' shell comprises a metal oxide comprising a cation derived from a metal selected from the group consisting of Ga, Sn, Sb, Cd, Bi, In and mixtures thereof; and
   c) said encapsulates' one or more multi-functional ligands comprise a head group that comprises a material selected from the group consisting of phosphonic acids, trialkoxysilanes, or mixtures thereof.

6. The article according to claim 5 wherein;
   a) said encapsulates' liquid metal core comprises a liquid metal alloy selected from the group consisting of Ga/In, Ga/In/Sn, Ga/In/Sn/Sb, In/Sn/Bi and mixtures thereof;
   b) said encapsulates' shell comprises a metal oxide comprising a cation derived from a metal selected from the group consisting of Ga, In, Bi and mixtures thereof; and
   c) said encapsulates' one or more multi-functional ligands comprise a head group that comprises a material selected from the group consisting of phosphonic acids or trialkoxysilanes possessing an acrylate or methacrylate moiety and mixtures thereof.

7. The article according to claim 6 wherein;
   a) said encapsulates' liquid metal core comprises a liquid metal alloy selected from the group consisting of 85.8 atom % Ga/14.2 atom % In, 78.3 atom % Ga/14.9 atom % In/6.8 atom % Sn and mixtures thereof; and
   c) said encapsulates' one or more multi-functional ligands comprise a head group that comprises a material selected from the group consisting of 11-phosphonoundecyl acrylate, 3-(trimethoxysilyl)propyl methacrylate and mixtures thereof.

8. The article according to claim 1, wherein said encapsulate has a shell thickness of from about 0.5 nanometers to about 5 nanometers.

9. The article according to claim 1, wherein said encapsulate has a principal dimension of from about 5 nanometers to about 5 millimeters.

10. The article according to claim 1, wherein said core shell liquid metal encapsulate network's linkage has the formula:

*-X-R-X-* wherein for said formula:
a) each * represents the chemical attachment point to a core shell liquid metal encapsulate;
b) each X represents a molecular segment selected from the group of chemical structures comprising C—S, C—N, C—P—O, C—Si—O, O—Si—O, C—O; and
c) R represents a molecular segment independently selected from the group of chemical structures comprising C—C, C=C, C—S—C, N—N—N, C—N, O—C—N, C—O—C, Si—O—Si.

11. The article according to claim 10, wherein said core shell liquid metal encapsulate network's linkage has the formula:

*-X-R-X-* wherein for said formula:
a) each * represents the chemical attachment point to a core shell liquid metal encapsulate;
b) each X represents a molecular segment selected from the group of chemical structures comprising thiols, amines, phosphonates, silyl ethers, esters and mixtures thereof; and
c) R represents a molecular segment independently selected from the group of chemical structures comprising thioethers, triazoles, dimerized ring systems, urethanes, ethers, esters, amides, tetrahydropyridines, alkanes, aromatics, siloxanes and mixtures thereof.

12. The article according to claim 11, wherein said core shell liquid metal encapsulate network's linkage has the formula:

*-X-R-X-* wherein for said formula:
a) each * represents the chemical attachment point to a core shell liquid metal encapsulate;
b) each X represents a molecular segment selected from the group of chemical structures comprising phosphonates and silyl ethers and mixtures thereof; and
c) R represents a molecular segment independently selected from the group of chemical structures comprising thioethers, triazoles, urethanes, ethers, amides, carboxylic acid esters, siloxanes and mixtures thereof.

13. The article according to claim 12, wherein said core shell liquid metal encapsulate network's linkage has the formula:

*-X-R-X-* wherein for said formula R represents a molecular segment independently selected from the group of chemical structures comprising polyethers, polyacrylates, polyacrylamides, polyurethanes, polysiloxanes, thioethers, triazoles, and mixtures thereof.

14. The article according to claim 1, wherein said core shell liquid metal encapsulate network comprises, based on total core shell liquid metal encapsulate network mass, from about 88.9% to about 99.99% metal.

15. The article according to claim 14, wherein said core shell liquid metal encapsulate network comprises, based on total core shell liquid metal encapsulate network mass, from about 95% to about 99.99% metal.

16. The article according to claim 15, wherein said core shell liquid metal encapsulate network comprises, based on total core shell liquid metal encapsulate network mass, from about 99% to about 99.99% metal.

17. An article according to claim 1 wherein said core shell liquid metal encapsulate network is a stretchable conductor that comprises a liquid metal selected from the group consisting of Hg, Pb, Sn, Sb, Cd, Bi, Ga, In, Al, Zn, Ag, Au, Tl and mixtures thereof.

18. An article according to claim 17, wherein said core shell liquid metal encapsulate network is a stretchable conductor that comprises a liquid metal selected from the group consisting of Ga, In, Sn, Bi, Pb, Cd, Sb and mixtures thereof.

19. An article according to claim 18, wherein said core shell liquid metal encapsulate network is a stretchable conductor that comprises a liquid metal selected from the group consisting of Ga, In, Sn, Bi, Sb and mixtures thereof.

20. An article according to claim 19, wherein said core shell liquid metal encapsulate network is a stretchable conductor that comprises a liquid metal selected from the group consisting of Ga, In and mixtures thereof.

21. The article according to claim 1, wherein said at least one conductor independently comprises a material selected from the group consisting of Cu, Au, Ag, Al, W, Ga, In, Sn, Hg, Bi, Ni, Ta, graphene, graphite, carbon nanotubes, conjugated polymers such as poly(3,4-ethylenedioxythiophene) (PEDOT) and doped PEDOT, transparent conductive oxides.

22. The article of claim 21 wherein said transparent conductive oxides are selected from the group consisting of indium tin oxide, fluorine doped tin oxide, doped zinc oxide and mixtures thereof.

23. The article according to claim 1, wherein each dielectric independently comprises a material selected from the group consisting of un-cross-linked liquid metal encapsulates, an organosilicon compound such as polydimethylsiloxane, a polyimide, a polyurethane such as thermoplastic urethanes, air, glass epoxy composites, fluorinated polymers, polyether ether ketone, liquid crystal polymers, hydrocarbon ceramic laminates, ceramics, and mixtures thereof.

24. The article of claim 23 wherein said fluorinated polymers comprise PTFE.

25. The article according to claim 1, said article being selected from the group consisting of antennas and transmission lines.

26. The article according to claim 25, wherein said article is transmission line selected from the group consisting of coplanar wave guides, coaxial wave guides, embedded microstrip lines, microstrip lines, striplines; frequency selective surfaces.

27. The article according to claim 26, wherein said article is a frequency selective surface selected from the group consisting of electromagnetic filters, RF shields, RF reflectors, and polarizers; inductors; electronic switches; electronic filter; conductive vias; or capacitors.

28. A method of using a core shell liquid metal encapsulate network to control the properties of an article according to claim 1 comprising using an unactivated core shell liquid metal encapsulate network as a dielectric to insulate one or more of said article's conductors; activating said core shell liquid metal encapsulate network; and/or changing the geometry of said liquid metal encapsulate network after said core shell liquid metal encapsulate network is activated.

29. A method according to claim 28, wherein activating said core shell liquid metal encapsulate network comprises mechanical elongation, compression, shearing, and/or directly impacting said core shell liquid metal encapsulate network.

30. The method of using a core shell liquid metal encapsulate network according claim 28, said method comprising using one or more of said activated core shell liquid metal encapsulate networks as article conductors.

* * * * *